US012441115B2

(12) United States Patent
Watanabe

(10) Patent No.: US 12,441,115 B2
(45) Date of Patent: Oct. 14, 2025

(54) LIQUID EJECTING HEAD AND LIQUID EJECTING APPARATUS

(71) Applicant: SEIKO EPSON CORPORATION, Tokyo (JP)

(72) Inventor: Eiichiro Watanabe, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 203 days.

(21) Appl. No.: 18/475,973

(22) Filed: Sep. 27, 2023

(65) Prior Publication Data

US 2024/0100843 A1 Mar. 28, 2024

(30) Foreign Application Priority Data

Sep. 28, 2022 (JP) ................................ 2022-154647

(51) Int. Cl.
*B41J 2/175* (2006.01)
*B41J 2/14* (2006.01)
*B41J 2/145* (2006.01)

(52) U.S. Cl.
CPC ....... *B41J 2/17513* (2013.01); *B41J 2/14274* (2013.01); *B41J 2/1433* (2013.01); *B41J 2/145* (2013.01); *B41J 2002/17516* (2013.01)

(58) Field of Classification Search
CPC .. B41J 2/17513; B41J 2/14274; B41J 2/1433; B41J 2/145; B41J 2002/17516
See application file for complete search history.

(56) References Cited

U.S. PATENT DOCUMENTS

| | | | | |
|---|---|---|---|---|
| 8,684,507 | B2 * | 4/2014 | Uezawa | B41J 29/02 347/89 |
| 11,034,149 | B2 * | 6/2021 | Nishimura | B41J 2/14201 |
| 2012/0188316 | A1 * | 7/2012 | Matsuoka | B41J 2/18 347/89 |
| 2022/0024207 | A1 | 1/2022 | Watanabe | |

FOREIGN PATENT DOCUMENTS

| | | | |
|---|---|---|---|
| JP | 2022-023542 | A | 2/2022 |

* cited by examiner

*Primary Examiner* — Jason S Uhlenhake
(74) *Attorney, Agent, or Firm* — WORKMAN NYDEGGER

(57) ABSTRACT

An individual flow path that communicates with a nozzle, a supply side common liquid chamber for supplying ink to the nozzle, a recovery side common liquid chamber for recovering the ink not discharged from the nozzle, an inlet that communicates with the supply side common liquid chamber, an outlet that communicates with the recovery side common liquid chamber, a first bypass flow path, and a second bypass flow path are provided, in which the inlet and the outlet are disposed between the first bypass flow path and the second bypass flow path, and a flow path resistance of the first bypass flow path and a flow path resistance of the second bypass flow path are different from each other.

13 Claims, 17 Drawing Sheets

LIQUID EJECTING HEAD AND LIQUID EJECTING APPARATUS

The present application is based on, and claims priority from JP Application Serial Number 2022-154647, filed Sep. 28, 2022, the disclosure of which is hereby incorporated by reference herein in its entirety.

BACKGROUND

1. Technical Field

The present disclosure relates to a liquid ejecting head for ejecting a liquid and a liquid ejecting apparatus.

2. Related Art

A liquid ejecting apparatus typified by an ink jet recording apparatus such as a printer or a plotter is provided with a liquid ejecting head such as an ink jet recording head that ejects ink.

For example, JP-A-2022-023542 discloses a liquid ejecting head provided with a nozzle row in which a plurality of nozzles for ejecting a liquid are disposed side by side, an individual flow path that communicates with each of nozzles, a supply side common liquid chamber and a recovery side common liquid chamber coupled to the individual flow paths, and a bypass flow path coupling the supply side common liquid chamber and the recovery side common liquid chamber to end portions of the supply side common liquid chamber and the recovery side common liquid chamber in the longitudinal direction. In addition, the supply side common liquid chamber is provided with a liquid inlet at the center in the longitudinal direction, and the recovery side common liquid chamber is provided with an ink outlet at the center in the longitudinal direction.

However, in the liquid ejecting head in the related art, a relationship between the flow path resistances of two bypass flow paths disposed at both ends of the supply side common liquid chamber and the recovery side common liquid chamber is not sufficiently considered.

SUMMARY

According to an aspect of the present disclosure, there is provided a liquid ejecting head including a first nozzle row configured by disposing side by side a plurality of first nozzles ejecting a liquid in a first direction, a plurality of first individual flow paths that communicate with each of the plurality of first nozzles, a first supply side common liquid chamber coupled to the plurality of first individual flow paths and for supplying the liquid to the plurality of first nozzles via the plurality of first individual flow paths, a first recovery side common liquid chamber coupled to the plurality of first individual flow paths and for recovering the liquid not discharged from the plurality of first nozzles via the plurality of first individual flow paths, a first inlet for supplying the liquid to the first supply side common liquid chamber, a first outlet for discharging the liquid from the first recovery side common liquid chamber, a first bypass flow path that couples an end portion of the first supply side common liquid chamber in the first direction and an end portion of the first recovery side common liquid chamber in the first direction, and a second bypass flow path that couples an end portion of the first supply side common liquid chamber in a second direction opposite to the first direction and an end portion of the first recovery side common liquid chamber in the second direction, in which the first inlet is disposed between the first bypass flow path and the second bypass flow path in the first direction, the first outlet is disposed between the first bypass flow path and the second bypass flow path in the first direction, and a flow path resistance of the first bypass flow path and a flow path resistance of the second bypass flow path are different from each other.

According to another aspect of the present disclosure, there is provided a liquid ejecting apparatus including the liquid ejecting head according to the above aspect, and a circulation mechanism including a liquid storage portion that stores a liquid and for circulating the liquid between the liquid ejecting head and the liquid storage portion.

DESCRIPTION OF EMBODIMENTS

Hereinafter, the present disclosure will be described in detail based on embodiments. However, the following description illustrates an aspect of the present disclosure, and can be randomly changed within the scope of the present disclosure.

In each figure, X, Y, and Z represent three spatial axes that are orthogonal to each other. The positive direction and the negative direction are not limited, and the directions along the three axes are defined as the X direction, the Y direction, and the Z direction. The directions to which the arrows in each drawing are directed are defined as the X1 direction, the Y1 direction, and the Z1 direction, and the directions opposite to the arrows are defined as the X2 direction, the Y2 direction, and the Z2 direction. The X1 direction corresponds to the "first direction", and the X2 direction corresponds to the "second direction" in the direction opposite to the first direction. In addition, the Y direction (Y1 direction and Y2 direction) corresponds to the "transport direction of a medium facing the liquid ejecting head". The "transport direction of the medium facing the liquid ejecting head" may be a direction intersecting the Y direction. The Z1 direction is downward in the vertical direction, and the Z2 direction is upward in the vertical direction. The Z direction needs not be the vertical direction. Furthermore, the X-axis, the Y-axis, and the Z-axis are orthogonal to each other but are not limited thereto, and may intersect at an angle within a range of, for example, 80 degrees or more and 100 degrees or less.

Embodiment 1

Figure 1:
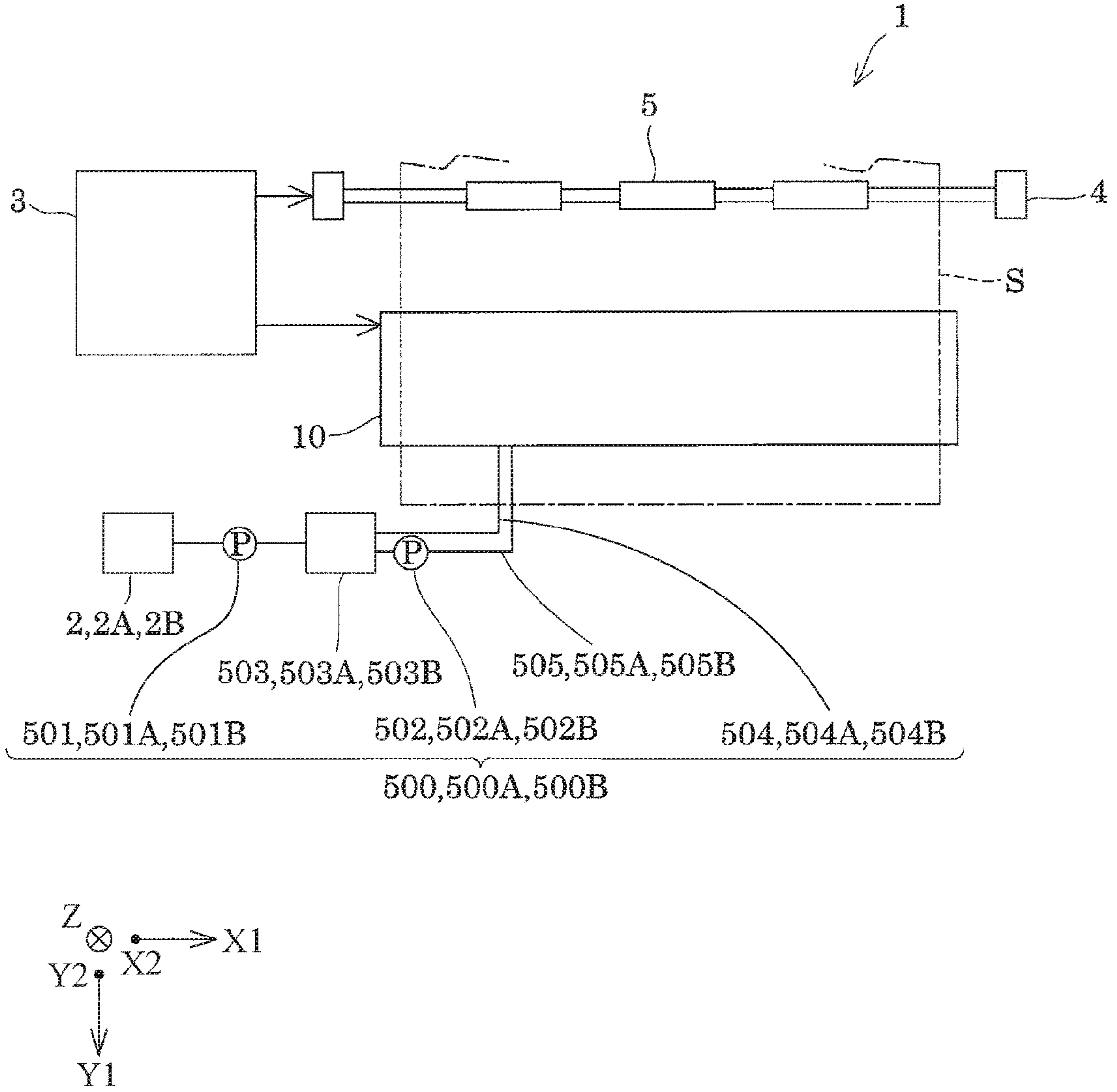
FIG. 1 is a plan view of an ink jet recording apparatus according to Embodiment 1.

An ink jet recording apparatus (hereinafter simply referred to as "recording apparatus") 1 illustrated in FIG. 1 is an example of a "liquid ejecting apparatus", and is a printing apparatus that ejects and lands ink, which is a type of liquid, as ink droplets on a medium S such as printing paper, and prints an image or the like by an arrangement of dots formed on the medium S. As the medium S, any material such as a resin film or cloth can be used in addition to the recording paper.

The recording apparatus 1 includes an ink jet recording head 10 (hereinafter, also simply referred to as "recording head 10"), a liquid container 2, a control portion 3, and a transport mechanism 4 that feeds out the medium S.

The ink jet recording head 10 is an example of a "liquid ejecting head".

The recording head 10 ejects the ink supplied from the liquid container 2 onto the medium S from a plurality of nozzles. The detailed configuration of the recording head 10 will be described later.

The liquid container 2 stores ink ejected from the recording head 10. Examples of the liquid container 2 include a cartridge that can be attached to and detached from the recording apparatus 1, a bag-shaped ink pack made of a flexible film, an ink tank that can be refilled with ink, and the like.

In the present embodiment, two liquid containers 2 are provided, and ink is supplied from two liquid containers 2 to one recording head 10. In the present embodiment, the same type of ink is stored in two liquid containers 2. That is, the same type of ink is supplied to two head chips 100A and 100B provided in the recording head 10 described later. Inks having different colors, components, and the like may be stored in each of a plurality of liquid containers 2. Each of two liquid containers 2 corresponding to one recording head 10 is defined as a liquid container 2A and a liquid container 2B, and in FIG. 1, the plurality of liquid containers 2 are collectively illustrated as one.

The recording apparatus 1 is provided with a circulation mechanism 500 for circulating ink between the recording head 10 and an auxiliary liquid container 503. In the present embodiment, two circulation mechanisms 500 are provided, the circulation mechanism 500 coupled to the liquid container 2A is referred to as a circulation mechanism 500A, and the circulation mechanism 500 coupled to the liquid container 2B is referred to as a circulation mechanism 500B.

The circulation mechanism 500 includes a supply pump 501, a circulation pump 502, an auxiliary liquid container 503, a recovery tube 504, and a supply tube 505. The auxiliary liquid container 503 is an example of a "liquid storage portion". In the present embodiment, each component of the circulation mechanism 500A is referred to as a supply pump 501A, a circulation pump 502A, an auxiliary liquid container 503A, a recovery tube 504A, and a supply tube 505A, and each component of the circulation mechanism 500B is referred to as a supply pump 501B, a circulation pump 502B, an auxiliary liquid container 503B, a recovery tube 504B, and a supply tube 505B. A configuration common to the circulation mechanism 500A and the circulation mechanism 500B will be described as the circulation mechanism 500.

The supply pump 501 is a pump for supplying the ink stored in the liquid container 2 to the auxiliary liquid container 503. The circulation pump 502 is a pump for supplying the ink stored in the auxiliary liquid container 503 to the recording head 10.

The recovery tube 504 is a member that is not used for printing in the recording head 10 and forms a flow path of ink recovered in the auxiliary liquid container 503. The supply tube 505 is a member that forms a flow path of ink supplied from the auxiliary liquid container 503 to the recording head 10.

The auxiliary liquid container 503 is a container that temporarily stores ink supplied from the liquid container 2. In addition, the auxiliary liquid container 503 is not used for printing in the recording head 10, and temporarily stores the ink recovered via the recovery tube 504.

In such a circulation mechanism 500, ink is supplied from the auxiliary liquid container 503 to the recording head 10 via the supply tube 505 by the circulation pump 502, and ink that is not used in the recording head 10 is recovered into the auxiliary liquid container 503 via the recovery tube 504. In addition, when the amount of ink stored in the auxiliary liquid container 503 is equal to or less than a certain amount, the ink is supplied from the liquid container 2 to the auxiliary liquid container 503 by the supply pump 501.

The liquid container 2A, the liquid container 2B, the circulation mechanism 500A, and the circulation mechanism 500B are provided in one recording head 10, but the configuration is not limited thereto. For example, the recording apparatus 1 may be provided with a plurality of recording heads 10. When the plurality of recording heads 10 are provided in the recording apparatus 1, a plurality of liquid containers and circulation mechanisms may be provided in each of the recording heads 10. Alternatively, a liquid container common to the plurality of recording heads 10 may be provided for each type of ink, and a circulation mechanism may be provided for distributing, supplying, and recovering various types of ink to each recording head 10.

The control portion 3 is provided with, for example, a control device such as a central processing unit (CPU) or a field programmable gate array (FPGA), and a storage device such as a semiconductor memory. The control portion 3 collectively controls each element of the recording apparatus 1, that is, the recording head 10, the transport mechanism 4, and the like, by executing the program stored in the storage device by the control device.

The transport mechanism 4 transports the medium S in the Y direction, and includes a transport roller 5. That is, the transport mechanism 4 transports the medium S in the Y direction by rotating the transport roller 5.

Such a recording apparatus 1 is a so-called line-type recording apparatus in which the recording head 10 is fixed and the medium S is transported in the Y direction with respect to the recording head 10. The width of the recording head 10 in the X direction is wider than the width of the medium S in the X direction, and the ink droplets can be ejected over the entire width of the medium S in the X direction.

Under the control of the control portion 3, the recording head 10 performs an ejection operation of ejecting ink supplied from the liquid container 2 from each of the plurality of nozzles as ink droplets onto the medium S in the Z1 direction. When the ejection operation by the recording head 10 is performed in parallel with the transport of the medium S by the transport mechanism 4, so-called printing, in which an image by ink is formed on the surface of the medium S, is performed.

The recording apparatus is not limited to the line type. For example, the recording apparatus may be a so-called serial type provided with a transport mechanism transporting the medium S in one direction and a moving mechanism reciprocating the recording head 10 in the other direction intersecting the one direction.

Figure 2:
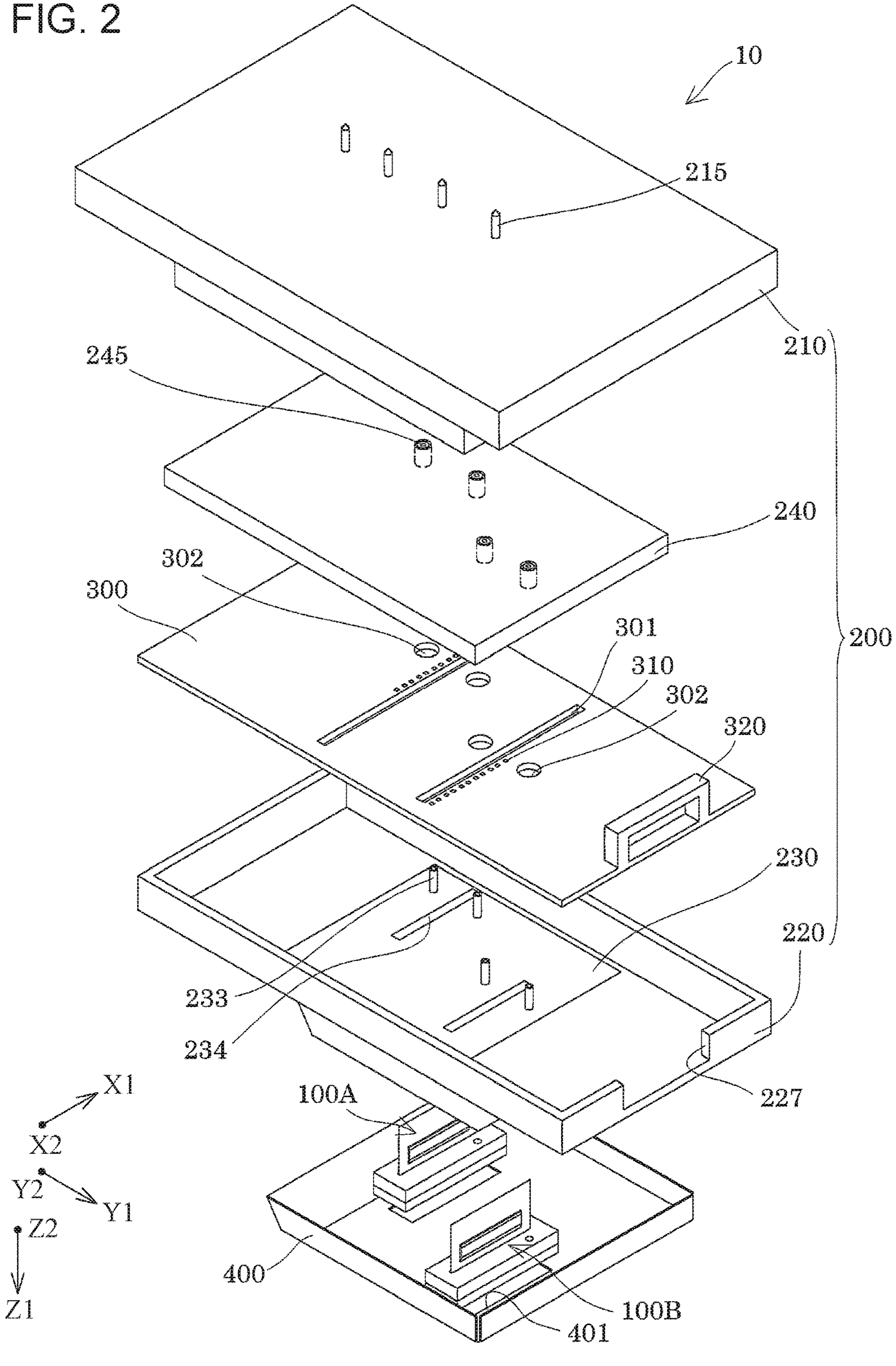
FIG. 2 is an exploded perspective view of a recording head according to Embodiment 1.
Figure 3:
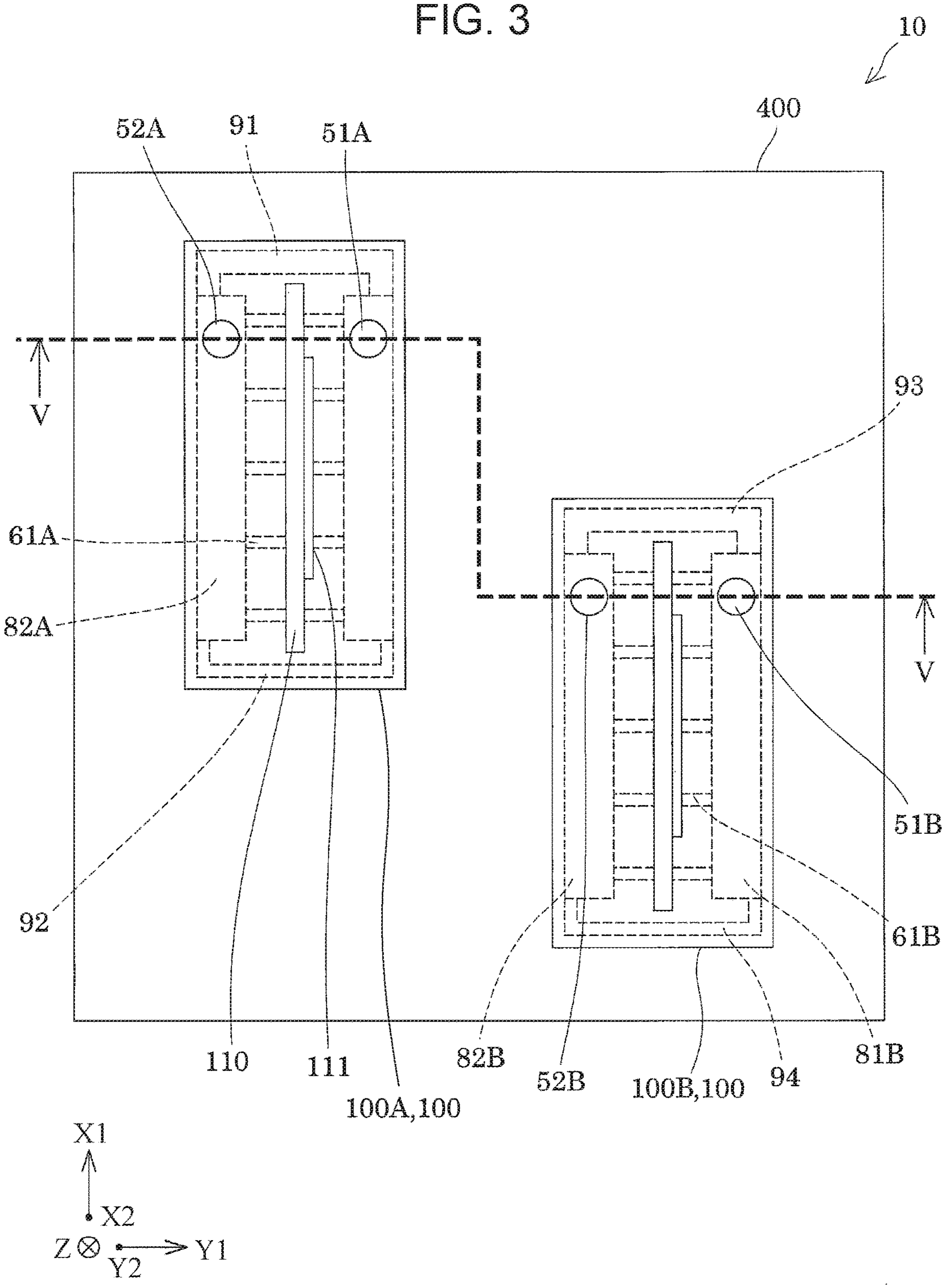
FIG. 3 is a plan view of the recording head according to Embodiment 1 when viewed in the Z1 direction.
Figure 4:
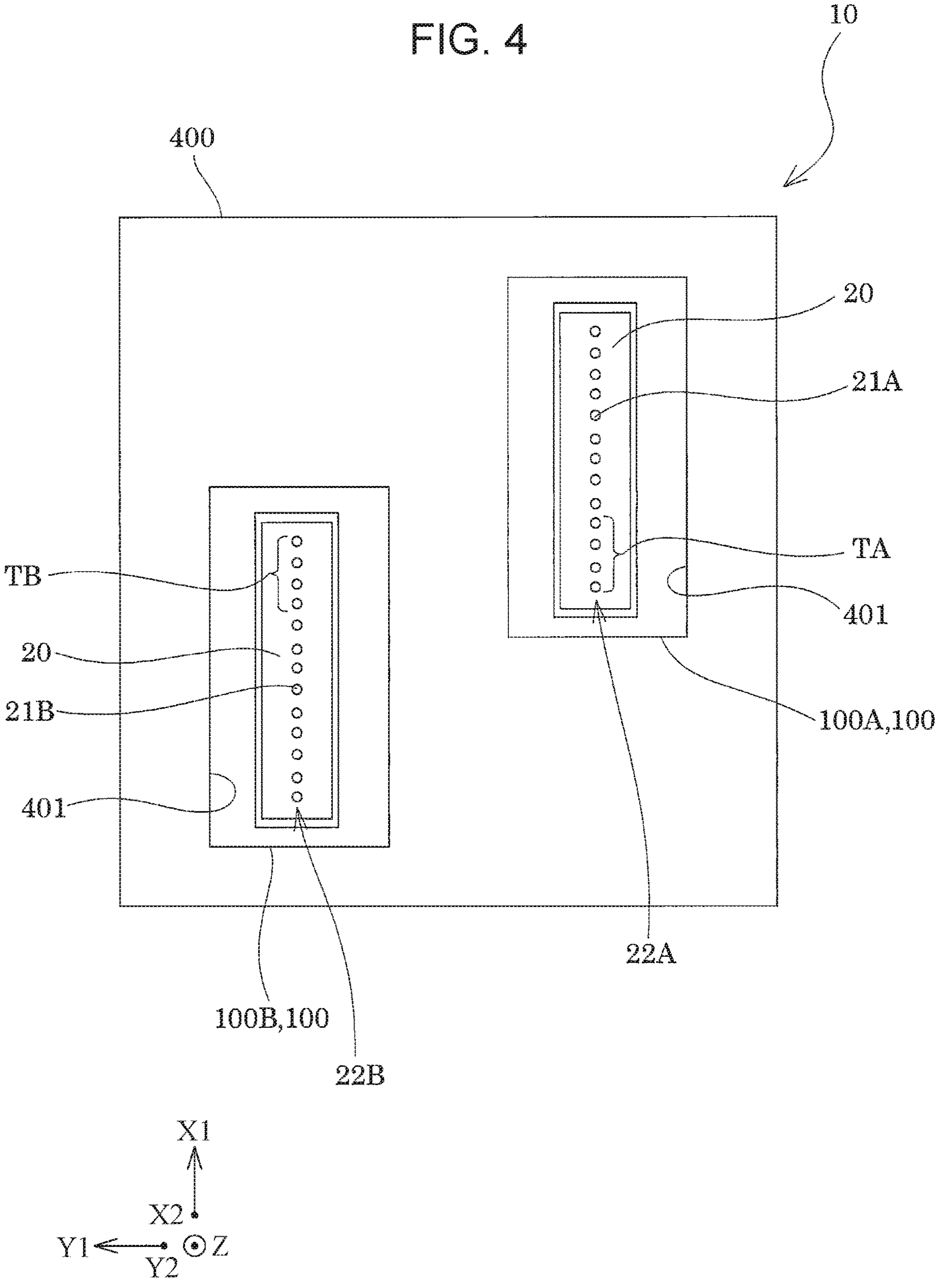
FIG. 4 is a plan view of the recording head according to Embodiment 1 when viewed in the Z2 direction.
Figure 5:
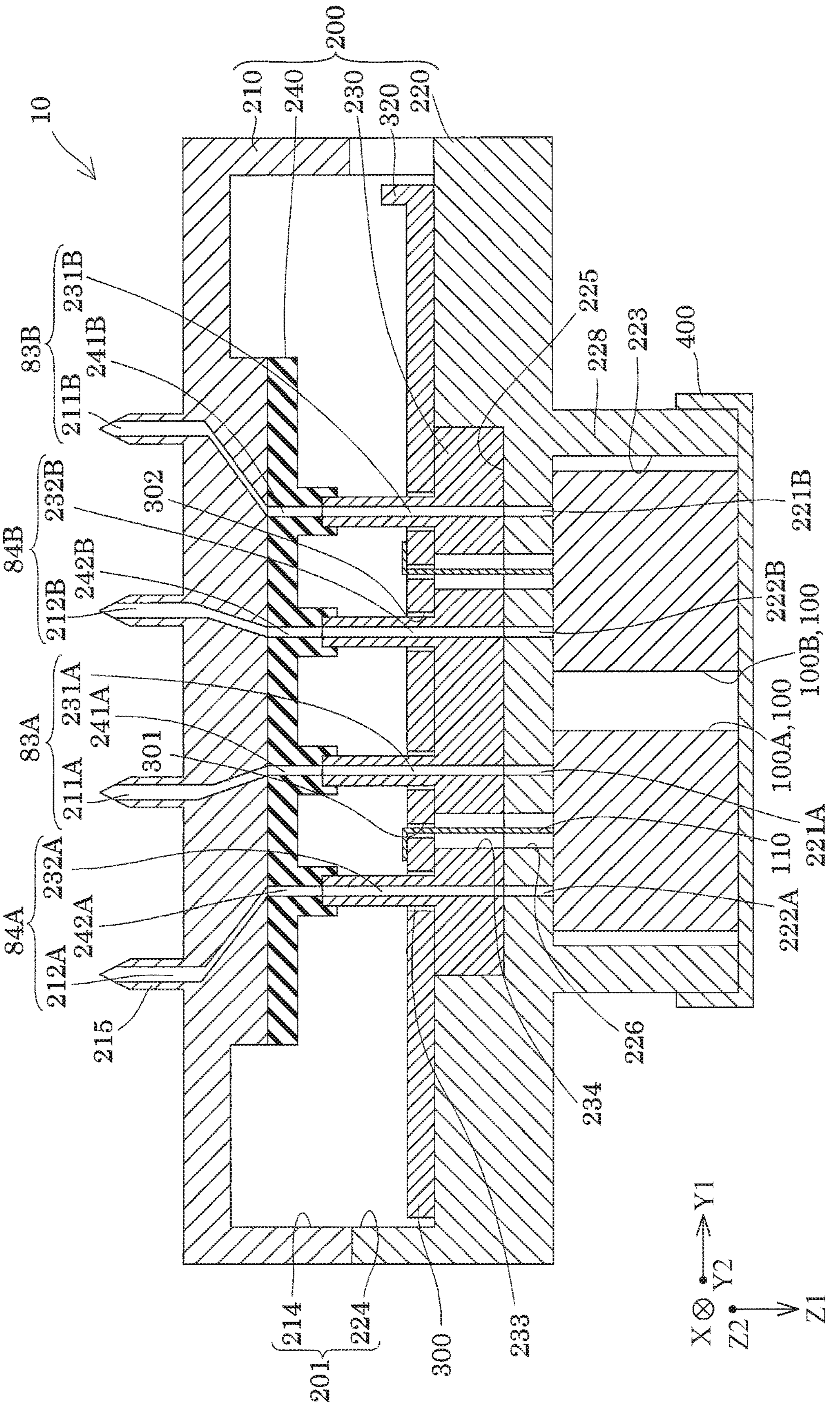
FIG. 5 is a cross-sectional view taken along the line V-V in FIG. 3.

The recording head 10 will be described with reference to FIGS. 2 to 5. FIG. 2 is an exploded perspective view of the recording head, FIG. 3 is a plan view of the recording head when viewed in the Z1 direction, FIG. 4 is a plan view of the recording head when viewed in the Z2 direction, and FIG. 5 is a cross-sectional view taken along the line V-V in FIG. 3. FIG. 3 illustrates the head chip 100A and the head chip 100B of the recording head 10, and the illustration of other members is omitted.

As illustrated, the recording head 10 is provided with a head chip 100, a flow path member 200, a relay substrate 300, and a fixing plate 400. In the present embodiment, the recording head 10 is provided with two head chips 100A and 100B. A configuration common to the head chip 100A and the head chip 100B will be described as the head chip 100, and a configuration specific to the head chip 100A and the head chip 100B will be described as the head chip 100A and the head chip 100B. The number of head chips 100 is not limited to two.

The flow path member 200 is provided with a first flow path member 210, a second flow path member 220, a third flow path member 230, and a sealing member 240.

The first flow path member 210 is a member provided with a flow path of ink, and includes a tubular coupling portion 215 protruding in the Z2 direction on a surface facing the Z2 direction. In addition, the first flow path member 210 is provided with a first inlet path 211A, a first inlet path 211B, a first outlet path 212A, and a first outlet path 212B. In the present embodiment, a total of four coupling portions 215 are provided corresponding to each of the first inlet path 211A, the first inlet path 211B, the first outlet path 212A, and the first outlet path 212B.

Each of the openings of the first inlet path 211A, the first inlet path 211B, the first outlet path 212A, and the first outlet path 212B on the Z2 direction side is formed at the tip end of the coupling portion 215. The supply tube 505A is coupled to the coupling portion 215 and communicates with the first inlet path 211A. Similarly, the supply tube 505B is coupled to the coupling portion 215 and communicates with the first inlet path 211B, the recovery tube 504A is coupled to the coupling portion 215 and communicates with the first outlet path 212A, and the recovery tube 504B is coupled to the coupling portion 215 and communicate with the first outlet path 212B.

The second flow path member 220 is a member that holds two head chips 100 and has a flow path of ink. Specifically, the second flow path member 220 is provided with an accommodating portion 223 capable of accommodating the head chip 100 on the Z1 direction side. The accommodating portion 223 protrudes toward the Z1 direction side and is formed by a wall portion 228 formed so as to surround the head chip 100. In the present embodiment, one accommodating portion 223 common to two head chips 100 is formed, but an accommodating portion 223 may be formed for each head chip 100.

The second flow path member 220 is provided with a second inlet path 221A, a second inlet path 221B, a second outlet path 222A, and a second outlet path 222B. An opening of each of the second inlet path 221A, the second inlet path 221B, the second outlet path 222A, and the second outlet path 222B on the Z2 direction side opens to a bottom portion of an accommodating recessed portion 225 formed on the surface facing the Z2 direction of the second flow path member 220, and communicates with each of a third inlet path 231A, a third inlet path 231B, a third outlet path 232A, and a third outlet path 232B, which will be described later. An opening of each of the second inlet path 221A, the second inlet path 221B, the second outlet path 222A, and the second outlet path 222B on the Z1 direction side opens to the accommodating portion 223, and communicates with a fifth inlet path 53A, a fifth inlet path 53B, a fifth outlet path 54A, and a fifth outlet path 54B of the head chip 100, which will be described later.

In addition, a first recessed portion 214 is formed on the Z1 direction side of the first flow path member 210, and a second recessed portion 224 is formed on the Z2 direction side of the second flow path member 220. By bonding the first flow path member 210 and the second flow path member 220, a substrate accommodating portion 201 including the first recessed portion 214 and the second recessed portion 224 is formed. The substrate accommodating portion 201 is a space having a size in which the third flow path member 230 and the relay substrate 300 are accommodated.

The third flow path member 230 is a member provided with a flow path of ink, and has a tubular coupling portion 233 protruding in the Z2 direction on a surface facing the Z2 direction. In addition, the third flow path member 230 is provided with a third inlet path 231A, a third inlet path 231B, a third outlet path 232A, and a third outlet path 232B. In the present embodiment, a total of four coupling portions 233 are provided corresponding to each of the third inlet path 231A, the third inlet path 231B, the third outlet path 232A, and the third outlet path 232B.

Each of the openings of the third inlet path 231A, the third inlet path 231B, the third outlet path 232A, and the third outlet path 232B on the Z2 direction side is formed at the tip end of the coupling portion 233. In addition, each of the openings of the third inlet path 231A, the third inlet path 231B, the third outlet path 232A, and the third outlet path 232B on the Z1 direction side is formed on the surface of the third flow path member 230 facing the Z1 direction.

The third flow path member 230 has the shape of being fitted into the accommodating recessed portion 225 of the second flow path member 220. The third flow path member 230 is fitted into the accommodating recessed portion 225 and fixed to the second flow path member 220. Each of the openings of the third inlet path 231A, the third inlet path 231B, the third outlet path 232A, and the third outlet path 232B on the Z1 direction side communicates with each of the second inlet path 221A, the second inlet path 221B, the second outlet path 222A, and the second outlet path 222B. Each of the openings of the third inlet path 231A, the third inlet path 231B, the third outlet path 232A, and the third outlet path 232B on the Z2 direction side communicates with each of the fourth inlet path 241A, the fourth inlet path 241B, the fourth outlet path 242A, and the fourth outlet path 242B, which will be described later.

The sealing member 240 is a member provided with a flow path of ink, and includes a tubular coupling portion 245 protruding in the Z1 direction on a surface facing the Z1 direction. In addition, the sealing member 240 is provided with a fourth inlet path 241A, a fourth inlet path 241B, a fourth outlet path 242A, and a fourth outlet path 242B. In the present embodiment, a total of four coupling portions 245 are provided corresponding to each of the fourth inlet path 241A, the fourth inlet path 241B, the fourth outlet path 242A, and the fourth outlet path 242B.

Each of the openings of the fourth inlet path 241A, the fourth inlet path 241B, the fourth outlet path 242A, and the fourth outlet path 242B on the Z1 direction side is formed at the tip end of the coupling portion 245. In addition, each of the openings of the fourth inlet path 241A, the fourth inlet path 241B, the fourth outlet path 242A, and the fourth outlet path 242B on the Z2 direction side is formed on a surface of the sealing member 240 facing the Z2 direction.

The sealing member 240 is pinched between the first flow path member 210 and the third flow path member 230, and couples the flow paths of the first flow path member 210 and the third flow path member 230 to each other. Specifically, each of the openings of the fourth inlet path 241A, the fourth inlet path 241B, the fourth outlet path 242A, and the fourth outlet path 242B on the Z1 direction side communicates with each of the third inlet path 231A, the third inlet path 231B, the third outlet path 232A, and the third outlet path 232B. Each of the openings of the fourth inlet path 241A, the fourth inlet path 241B, the fourth outlet path 242A, and the fourth outlet path 242B on the Z2 direction side communicates with each of the first inlet path 211A, the first inlet path 211B, the first outlet path 212A, and the first outlet path 212B.

The sealing member 240 is made of an elastic material that has liquid resistance to a liquid such as ink and is elastically deformable. By providing such a sealing member 240, ink is supplied from the first inlet path 211A to the fourth inlet path 241A without leaking. Similarly, ink is supplied from the first inlet path 211B to the fourth inlet path 241B without leaking. In addition, ink is recovered from the fourth outlet path 242A to the first outlet path 212A without leaking. Similarly, the ink is recovered from the fourth outlet path 242B to the first outlet path 212B without leaking.

The relay substrate 300 is a substrate provided with a circuit and electronic components that electrically relay the head chip 100A, the wiring substrate 140 of the head chip 100B, and the control portion 3. In addition, the relay substrate 300 is provided with an insertion hole 302 which is a through-hole through which the coupling portion 233 of the third flow path member 230 is inserted. In the present embodiment, a total of four insertion holes 302 are provided corresponding to each coupling portion 233.

In addition, the relay substrate 300 is formed with a first wiring insertion hole 301 penetrating in the Z direction, the second flow path member 220 is formed with a second wiring insertion hole 226 penetrating in the Z direction, and the third flow path member 230 is formed with a third wiring insertion hole 234 penetrating in the Z direction. The first wiring insertion hole 301, the second wiring insertion hole 226, and the third wiring insertion hole 234 all have a shape through which the wiring substrate 140 of the head chip 100 can be inserted. In the present embodiment, two first wiring insertion holes 301, two second wiring insertion holes 226, and two third wiring insertion holes 234 are provided corresponding to each of the wiring substrates 140 of two head chips 100A and 100B.

The relay substrate 300 is provided with a terminal portion 310 to which the wiring substrate 140 is coupled on the Z1 side. In the present embodiment, the terminal portion 310 is provided at the opening edge portion of the first wiring insertion hole 301. The wiring substrate 140 is inserted into the first wiring insertion hole 301 in the Z2 direction, the tip end portion is bent, and is electrically coupled to the terminal portion 310. In addition, a connector 320 is provided on the Y1 direction side of the relay substrate 300. The connector 320 faces a connector insertion port 227 that communicates the outside with the substrate accommodating portion 201 provided on the Y1 side of the second flow path member 220. A wiring (not illustrated) is coupled to the connector 320, and the connector 320 is electrically coupled to the control portion 3 via the wiring. That is, various signals for printing from the control portion 3 and electric power from the power source are coupled to the circuit of the relay substrate 300 via the wiring and the connector 320.

In the relay substrate 300, the coupling portion 233 of the third flow path member 230 fixed to the accommodating recessed portion 225 of the second flow path member 220 is placed on the Z2 direction side of the second flow path member 220 in a state where the first wiring insertion hole 301 is inserted. The sealing member 240 is disposed on the Z2 direction side of the relay substrate 300, and the coupling portion 245 of the sealing member 240 and the coupling portion 233 of the third flow path member 230 are coupled to each other. The first flow path member 210 and the second flow path member 220 pinch the relay substrate 300 and the sealing member 240 and are bonded to each other. The first flow path member 210 and the second flow path member 220 are fixed by a fixing unit such as a screw (not illustrated) to form the flow path member 200 in which the relay substrate 300 is accommodated in the substrate accommodating portion 201.

By bonding each member in this manner, a first supply flow path 83A is formed in which the first inlet path 211A, the fourth inlet path 241A, the third inlet path 231A, the second inlet path 221A, and the fifth inlet path 53A communicate in this order. Similarly, a second supply flow path 83B is formed in which the first inlet path 211B, the fourth inlet path 241B, the third inlet path 231B, the second inlet path 221B, and the fifth inlet path 53B communicate in this order. A first recovery flow path 84A is formed in which the first outlet path 212A, the fourth outlet path 242A, the third outlet path 232A, the second outlet path 222A, and the fifth outlet path 54A communicate in this order. A second recovery flow path 84B is formed in which the first outlet path 212B, the fourth outlet path 242B, the third outlet path 232B, the second outlet path 222B, and the fifth outlet path 54B communicate in this order.

The first supply flow path 83A is a flow path of ink supplied from the supply tube 505A to a first supply side common liquid chamber 81A of the head chip 100A. The second supply flow path 83B is a flow path of ink supplied from the supply tube 505B to a second supply side common liquid chamber 81B of the head chip 100B. The first recovery flow path 84A is a flow path of ink recovered from a first recovery side common liquid chamber 82A of the head chip 100A to the recovery tube 504A. The second recovery flow path 84B is a flow path of ink recovered from a second recovery side common liquid chamber 82B of the head chip 100B to the recovery tube 504B.

When describing common to the first supply flow path 83A and the second supply flow path 83B, it is described as the supply flow path 83, and when describing each specific description, they are described as the first supply flow path 83A and the second supply flow path 83B. When describing common to the first recovery flow path 84A and the second recovery flow path 84B, it is described as the recovery flow path 84, and when describing each specific description, they are described as the first recovery flow path 84A and the second recovery flow path 84B.

In the flow path member 200 that accommodates the relay substrate 300 and provided with the supply flow path 83 and the recovery flow path 84, the fixing plate 400 is provided on the Z1 direction side. In the present embodiment, the fixing plate 400 has a size that covers the opening of the accommodating portion 223 on the Z1 direction side. In addition, the fixing plate 400 is provided with an exposed opening 401 that exposes a first nozzle 21A or a second nozzle 21B. In the present embodiment, two exposed openings 401 are provided corresponding to each of two head chips 100. As described above, a plurality of exposed openings 401 may be provided for each head chip 100, or an exposed opening 401 common to the plurality of head chips 100 may be provided.

Figure 6:
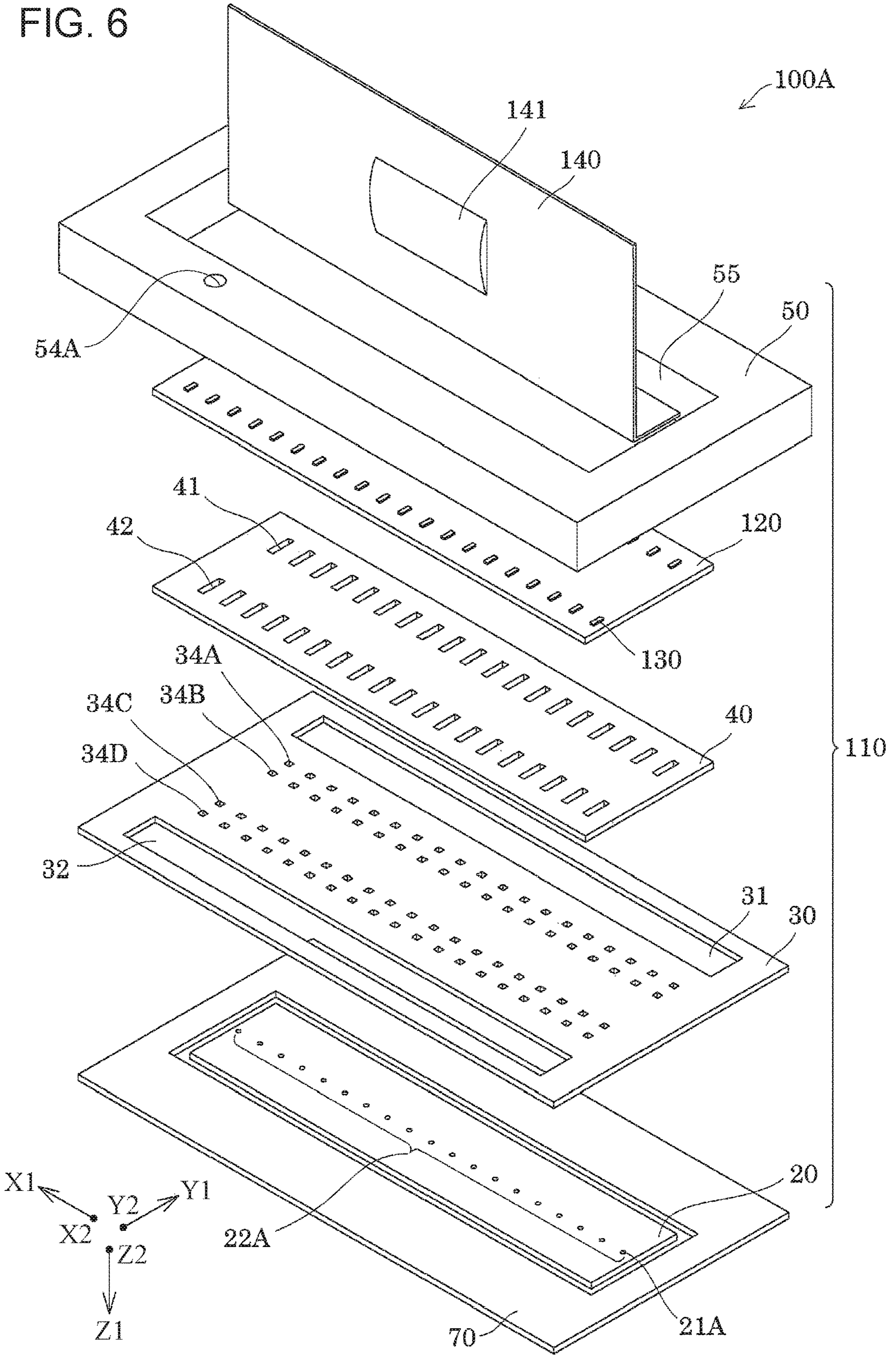
FIG. 6 is an exploded perspective view of a head chip according to Embodiment 1.
Figure 7:
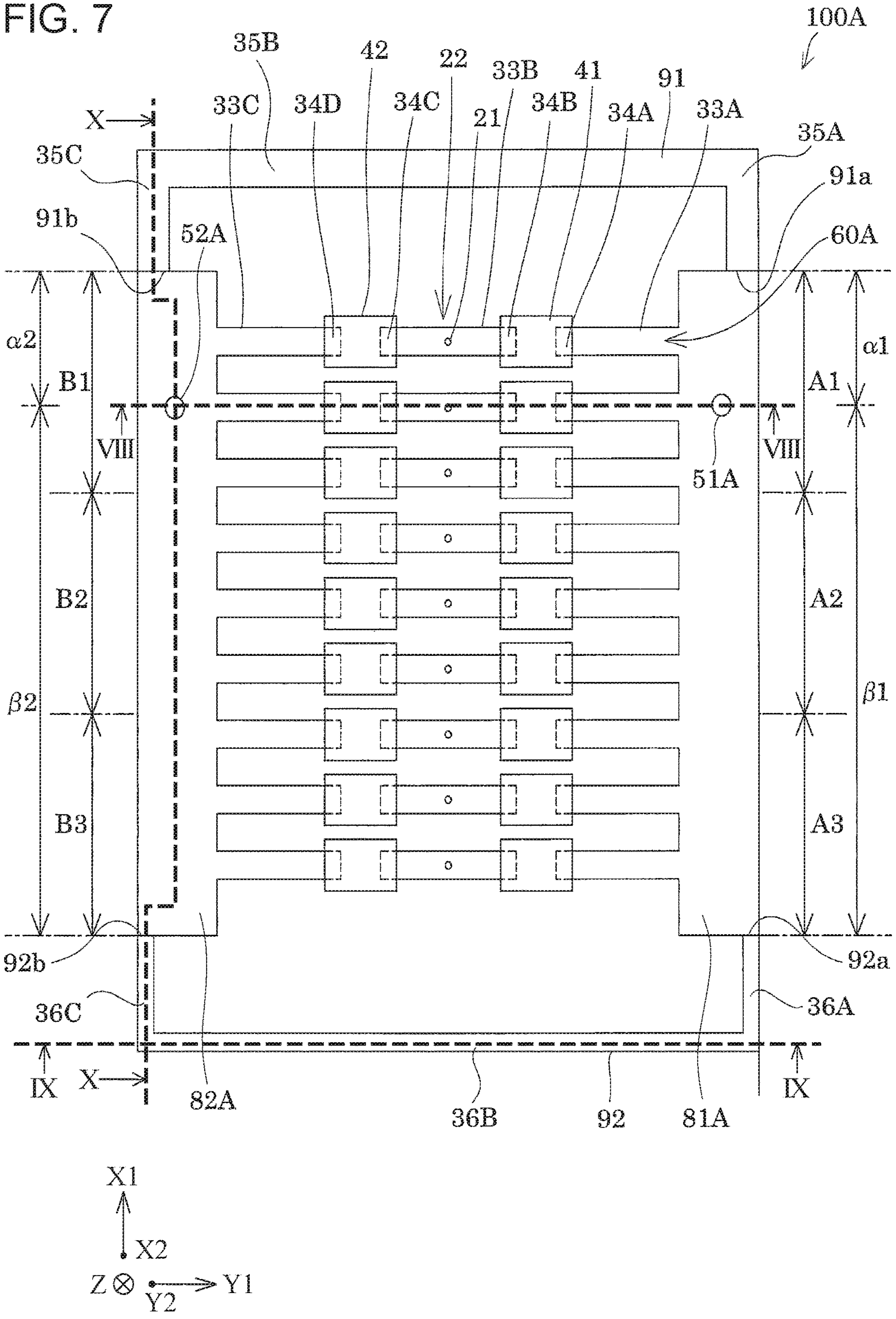
FIG. 7 is a plan view of a flow path of ink formed in the head chip according to Embodiment 1.
Figure 8:
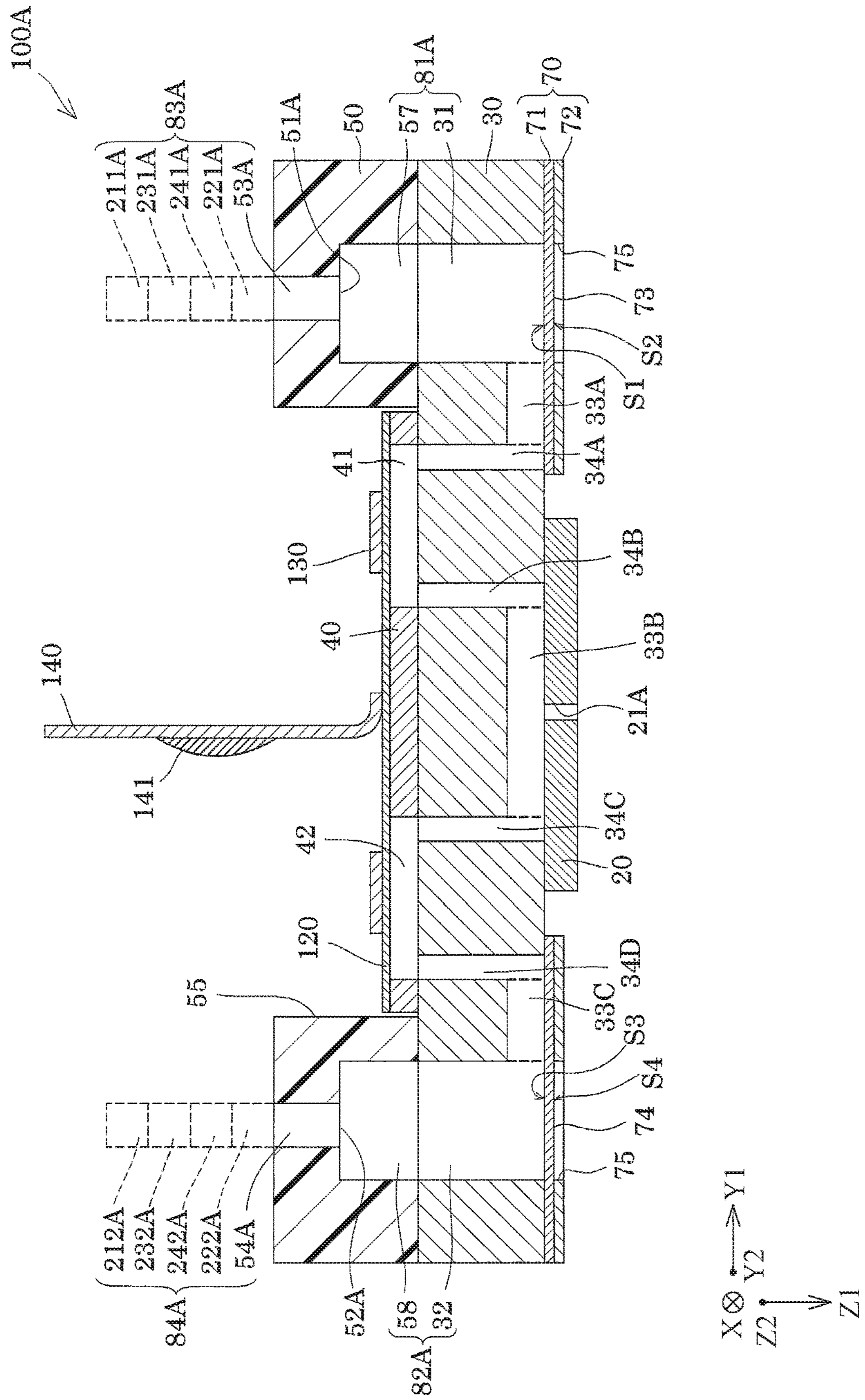
FIG. 8 is a cross-sectional view taken along the line VIII-VIII in FIG. 7.
Figure 9:
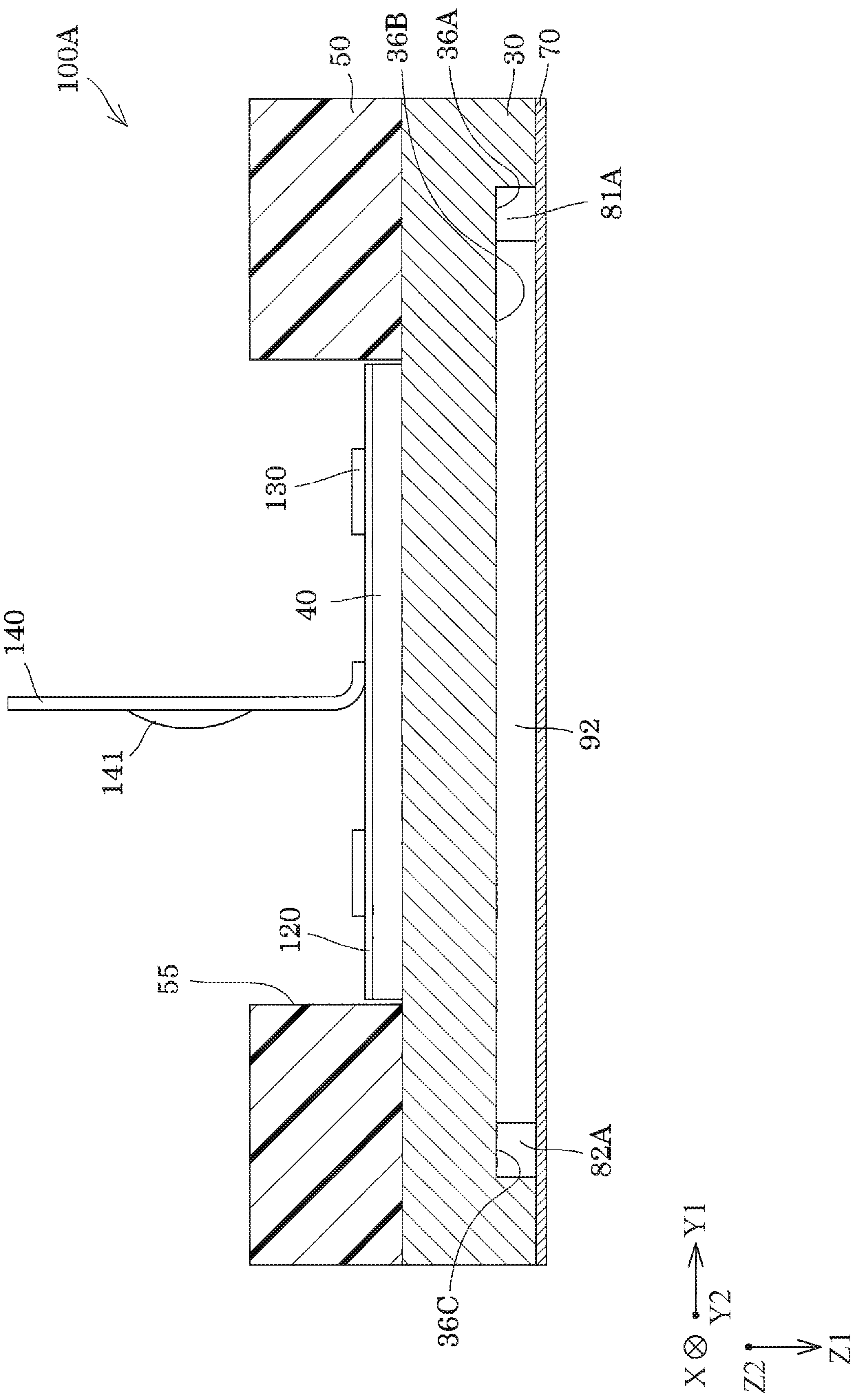
FIG. 9 is a cross-sectional view taken along the line IX-IX in FIG. 7.
Figure 10:
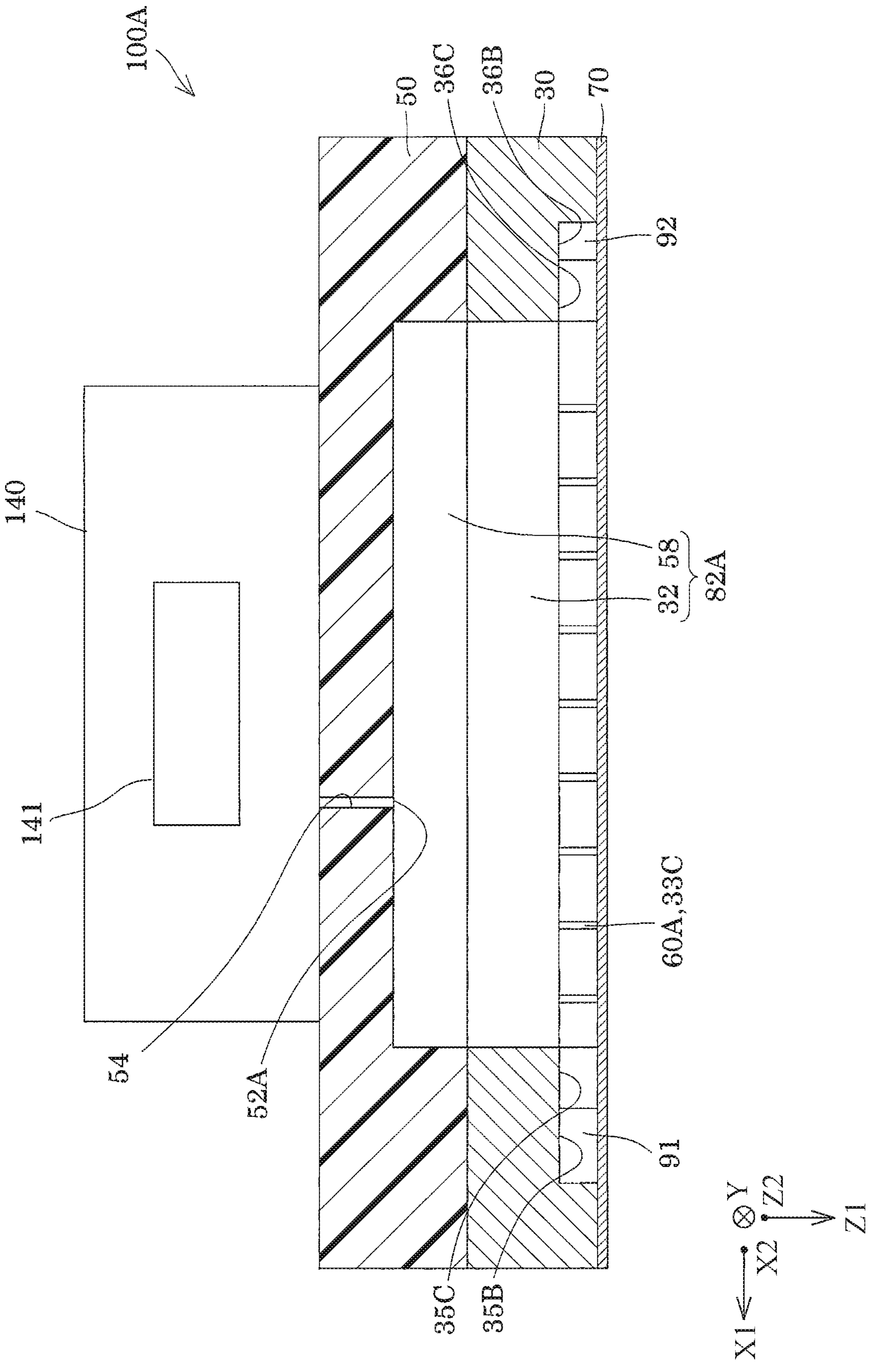
FIG. 10 is a cross-sectional view taken along the line X-X in FIG. 7.

FIG. 6 is an exploded perspective view of the head chip 100, and FIG. 7 is a plan view of a flow path of ink formed in the head chip 100. FIG. 8 is a cross-sectional view taken along the line VIII-VIII in FIG. 7, FIG. 9 is a cross-sectional view taken along the line IX-IX in FIG. 7, and FIG. 10 is a cross-sectional view taken along the line X-X in FIG. 7. The head chip 100A will be described with reference to FIGS. 3, 4, and 6 to 10. Although the head chip 100A will be illustrated and described in FIGS. 6 to 10, the head chip 100A and the head chip 100B have the same configuration, and each part of the head chip 100A and the head chip 100B having different name is as follows.

The first nozzle 21A of the head chip 100A is the second nozzle 21B of the head chip 100B.

A first nozzle row 22A of the head chip 100A is a second nozzle row 22B in the head chip 100B.

A first individual flow path 60A of the head chip 100A is a second individual flow path 60B in the head chip 100B.

The first supply side common liquid chamber 81A of the head chip 100A is the second supply side common liquid chamber 81B of the head chip 100B.

The first recovery side common liquid chamber 82A of the head chip 100A is the second recovery side common liquid chamber 82B of the head chip 100B.

A first inlet 51A of the head chip 100A is a second inlet 51B in the head chip 100B.

A first outlet 52A of the head chip 100A is a second outlet 52B in the head chip 100B.

A first bypass flow path 91 of the head chip 100A is a third bypass flow path 93 in the head chip 100B.

A second bypass flow path 92 of the head chip 100A is a fourth bypass flow path 94 in the head chip 100B.

The first supply flow path 83A of the head chip 100A is the second supply flow path 83B in the head chip 100B.

The first recovery flow path 84A of the head chip 100A is the second recovery flow path 84B in the head chip 100B.

The head chip 100A includes a flow path forming substrate 110 on which an ink flow path through which ink flows is formed, a diaphragm 120, and a piezoelectric actuator 130.

A plurality of first nozzles 21A for ejecting ink are formed on a nozzle substrate 20 forming the flow path forming substrate 110. In the present embodiment, the nozzle substrate 20 is provided with a first nozzle row 22A configured by disposing side by side the plurality of first nozzles 21A in the X1 direction. For example, the nozzle substrate 20 is manufactured so that a silicon single crystal substrate is processed by using a semiconductor manufacturing technique such as etching. However, a material and a manufacturing method of the nozzle substrate 20 are not particularly limited, and a known material and manufacturing method can be randomly adopted.

The flow path forming substrate 110 includes a plurality of substrates stacked in the Z direction, and an ink flow path through which ink flows is formed inside. In the present embodiment, the flow path forming substrate 110 includes a nozzle substrate 20, a communication plate 30, a pressure chamber substrate 40, and a liquid chamber forming substrate 50 stacked in the Z direction.

The head chip 100A is provided with a plurality of first individual flow paths 60A. In the present embodiment, the first individual flow path 60A extends in the Y direction when viewed in the Z direction, and a plurality of first individual flow paths 60A are disposed at intervals in the X direction. Each first individual flow path 60A communicates with each first nozzle 21A of the nozzle substrate 20.

The head chip 100A is provided with the first supply side common liquid chamber 81A coupled to the plurality of first individual flow paths 60A and for supplying ink to the plurality of first nozzles 21A via the plurality of first individual flow paths 60A and the first recovery side common liquid chamber 82A coupled to the plurality of first individual flow paths 60A for recovering ink not discharged from the plurality of first nozzles 21A via the plurality of first individual flow paths 60A. In the present embodiment, the first supply side common liquid chamber 81A extends in the X direction and is provided in the Y1 direction with respect to the first individual flow path 60A. The first recovery side common liquid chamber 82A extends in the X direction and is provided in the Y2 direction with respect to the first individual flow path 60A.

The head chip 100A is provided with the first bypass flow path 91 that couples an end portion of the first supply side common liquid chamber 81A in the X1 direction and an end portion of the first recovery side common liquid chamber 82A in the X1 direction. The flow path forming substrate 110 is provided with the second bypass flow path 92 that couples an end portion of the first supply side common liquid chamber 81A in the X2 direction and an end portion of the first recovery side common liquid chamber 82A in the X2 direction.

Here, the end portion of the first supply side common liquid chamber 81A is a region at both ends when the first supply side common liquid chamber 81A is divided into three parts in the X1 direction which is the longitudinal direction of the first supply side common liquid chamber 81A. In addition, the end portions of the first supply side common liquid chamber 81A are more preferably both ends when the first supply side common liquid chamber 81A is divided into five parts in the X1 direction, and even more preferably both ends when the first supply side common liquid chamber 81A is divided into ten parts. The end portion of the first recovery side common liquid chamber 82A is a region at both ends when the first recovery side common liquid chamber 82A is divided into three parts in the X1 direction which is the longitudinal direction of the first recovery side common liquid chamber 82A. In addition, the end portions of the first recovery side common liquid chamber 82A are more preferably both ends when the first recovery side common liquid chamber 82A is divided into five parts in the X1 direction, and even more preferably both ends when the first recovery side common liquid chamber 82A is divided into ten parts.

In the present embodiment, the first bypass flow path 91 couples a region A1 on the X1 direction side when the first supply side common liquid chamber 81A is divided into three parts in the X1 direction and a region B1 on the X1 direction side when the first recovery side common liquid chamber 82A is divided into three parts in the X1 direction. The second bypass flow path 92 couples a region A3 on the X2 direction side when the first supply side common liquid chamber 81A is divided into three parts in the X1 direction and a region B3 on the X2 direction side when the first recovery side common liquid chamber 82A is divided into three parts in the X1 direction. The region A2 is a region between the region A1 and the region A3, and the region B2 is a region between the region B1 and the region B3.

A first bypass inlet 91*a*, which is one opening of the first bypass flow path 91, is disposed at the end of the region A1 in the X1 direction, and a first bypass outlet 91*b*, which is the other opening of the first bypass flow path 91, is disposed at the end of the region B1 in the X1 direction. In the present embodiment, in the X direction, the first bypass inlet 91*a* and the first bypass outlet 91*b* are located outside the first nozzles 21A at both ends of the first nozzle row 22A disposed side by side in the X direction.

A second bypass inlet 92*a*, which is one opening of the second bypass flow path 92, is disposed at the end of the region A3 in the X2 direction, and a second bypass outlet 92*b*, which is the other opening of the second bypass flow path 92, is disposed at the end of the region B3 in the X2 direction. In the present embodiment, in the X direction, the second bypass inlet 92*a* and the second bypass outlet 92*b* are located outside the first nozzles 21A at both ends of the first nozzle row 22A disposed side by side in the X direction.

The head chip 100A is provided with a first inlet 51A for supplying ink to the first supply side common liquid chamber 81A. In the present embodiment, the first inlet 51A is an opening on the first supply side common liquid chamber 81A side of the openings of the first supply flow path 83A. In addition, the flow path forming substrate 110 is provided with a first outlet 52A for discharging ink from the first recovery side common liquid chamber 82A. In the present embodiment, the first outlet 52A is an opening on the first recovery side common liquid chamber 82A side of the openings of the first recovery flow path 84A.

The first inlet 51A is disposed between the first bypass flow path 91 and the second bypass flow path 92 in the X1 direction. Specifically, the first inlet 51A is disposed in the X1 direction with respect to the center of the first supply side common liquid chamber 81A in the X1 direction. In the present embodiment, the first inlet 51A is disposed in the region A1 of the first supply side common liquid chamber 81A. Although not particularly illustrated, the first inlet 51A may be disposed in a region located on the X1 direction side of a region obtained by dividing the first supply side common liquid chamber 81A into five parts in the X1 direction.

The first outlet 52A is disposed between the first bypass flow path 91 and the second bypass flow path 92 in the X1 direction. Specifically, the first outlet 52A is disposed in the X1 direction with respect to the center of the first recovery side common liquid chamber 82A in the X1 direction. In the present embodiment, the first outlet 52A is disposed in the region B1 of the first recovery side common liquid chamber 82A. Although not particularly illustrated, the first outlet 52A may be disposed in a region located on the X1 direction side of a region obtained by dividing the first recovery side common liquid chamber 82A into five parts in the X1 direction.

In addition, in the X direction, a relative position of the first inlet 51A with respect to the first supply side common liquid chamber 81A and a relative position of the first outlet 52A with respect to the first recovery side common liquid chamber 82A are substantially the same as each other. Specifically, al which is the distance between the first inlet 51A and the end of the first supply side common liquid chamber 81A in the X1 direction, and $\alpha 2$ which is the distance between the first outlet 52A and the end of the first recovery side common liquid chamber 82A in the X1 direction are substantially the same as each other. The term "substantially the same as each other" as used herein means that $\alpha 1$ and $\alpha 2$ are the same as each other, or that the difference between $\alpha 1$ and $\alpha 2$ is within 10% of the flow path length, when the flow path length of the first supply side common liquid chamber 81A and the first recovery side common liquid chamber 82A in the X direction, which is the longitudinal direction, is 100%.

In such a flow path forming substrate 110, ink is supplied from the auxiliary liquid container 503A of the circulation mechanism 500A to the first supply side common liquid chamber 81A from the first inlet 51A via the supply tube 505A and the first supply flow path 83A.

The ink in the first supply side common liquid chamber 81A is supplied to each first individual flow path 60A, and the ink supplied to each first individual flow path 60A is ejected from each first nozzle 21A. Of the ink supplied to each first individual flow path 60A, the ink that is not ejected from the first nozzle 21A is discharged to the first recovery side common liquid chamber 82A. In addition, ink is introduced from the first supply side common liquid chamber 81A into the first recovery side common liquid chamber 82A through the first bypass flow path 91 and the second bypass flow path 92. The ink introduced into the first recovery side common liquid chamber 82A is recovered from the first outlet 52A to the auxiliary liquid container 503A of the circulation mechanism 500A via the first recovery flow path 84A and the recovery tube 504A.

As can be understood from the above, the ink flowing through the first supply side common liquid chamber 81A and the ink flowing through the first recovery side common liquid chamber 82A have opposite flows in the X direction. Specifically, in the first supply side common liquid chamber 81A, ink flows from the first inlet 51A to the first bypass flow path 91 in the X1 direction, and ink flows from the first inlet 51A to the second bypass flow path 92 in the X2 direction. In addition, in the first recovery side common liquid chamber 82A, ink flows from the first bypass flow path 91 to the first outlet 52A in the X2 direction, and ink flows from the second bypass flow path 92 to the first outlet 52A in the X1 direction.

As described above, the head chip 100A is configured such that the ink supplied from the liquid container 2A circulates through the first supply side common liquid chamber 81A, the first individual flow path 60A, and the first recovery side common liquid chamber 82A. In the recording head 10 having such a configuration, even when there is a period during which the ink of the first individual flow path 60A is not ejected from the first nozzle 21A, ink retention in the first individual flow path 60A, the first bypass flow path 91, and the second bypass flow path 92 can be suppressed. Therefore, the thickening of the ink in the first nozzle 21A, a first pressure chamber 41, and a second pressure chamber 42, which will be described later, and the like can be suppressed, and the occurrence of an ejection abnormality caused by the thickening of the ink can be prevented.

Next, the configuration of the flow path forming substrate 110 of the head chip 100 will be described more specifically. The pressure chamber substrate 40 is provided with a plurality of first pressure chambers 41 and second pressure chambers 42 corresponding to each first nozzle 21A. The first pressure chamber 41 and the second pressure chamber 42 are provided to penetrate the pressure chamber substrate 40 in the Z direction, which is the thickness direction. In the present embodiment, one first individual flow path 60A includes one first pressure chamber 41 and one second pressure chamber 42. A part of the first individual flow path 60A on the first supply side common liquid chamber 81A side from the first nozzle 21A serves as the first pressure chamber 41. A part of the first individual flow path 60A on the first recovery side common liquid chamber 82A side from the first nozzle 21A serves as the second pressure chamber 42. The first pressure chamber 41 and the second pressure chamber 42 are disposed side by side in a row along the Y direction. In addition, the plurality of first pressure chambers 41 are disposed side by side in a row along the X direction, and the plurality of second pressure chambers 42 are disposed side by side in a row along the X direction. The number of pressure chambers provided corresponding to one first nozzle 21A may be one, in other words, either one of the first pressure chamber 41 and the second pressure chamber 42 may be provided for one first nozzle 21A.

For example, the pressure chamber substrate 40 is manufactured so that a silicon single crystal substrate is processed by using a semiconductor manufacturing technique. However, a material and a manufacturing method of the pressure chamber substrate 40 are not particularly limited, and any material and manufacturing method can be adopted.

The diaphragm 120 and the piezoelectric actuator 130 are formed on the Z2 direction side of the pressure chamber substrate 40. The piezoelectric actuator 130 is provided at a position on the diaphragm 120 corresponding to the first pressure chamber 41 and the second pressure chamber 42.

The piezoelectric actuator 130 is also referred to as a piezoelectric element and refers to a portion including the first electrode, the piezoelectric layer, and the second electrode. In general, one of the electrodes of the piezoelectric actuator 130 is used as a common electrode and the other electrode and the piezoelectric layer are patterned for each of the first pressure chamber 41 and the second pressure chamber 42. In the present embodiment, although the first electrode is used as the common electrode of the piezoelectric actuator and the second electrode is used as the individual electrode of the piezoelectric actuator, there is no problem even when the electrodes are reversed for the convenience of the drive circuit and wiring. A lead electrode is coupled to each of the second electrodes of the piezoelectric actuators 130 and a voltage is selectively applied to each of the piezoelectric actuators 130 via the lead electrode.

A wiring substrate 140 is mounted on a surface of the diaphragm 120 on the Z2 direction side, and is coupled to the piezoelectric actuator 130. A drive circuit 141 such as a drive IC for driving the piezoelectric actuator 130 is mounted on the wiring substrate 140.

The communication plate 30 is formed with a first communication flow path 33A, a first communication flow path 33B, a first communication flow path 33C, a second communication flow path 34A, a second communication flow path 34B, a second communication flow path 34C, and a second communication flow path 34D, which constitute a part of the first individual flow path 60A, a first supply flow path portion 31 to which one end of the first individual flow path 60A is coupled, and a first recovery flow path portion 32.

The first supply flow path portion 31 is continuously provided near the end portion of the communication plate 30 on the Y1 direction side and over a region corresponding to the first individual flow path 60A along the X direction. The first supply flow path portion 31 communicates with the second supply flow path portion 57 provided on the liquid chamber forming substrate 50 to form the first supply side common liquid chamber 81A.

The first recovery flow path portion 32 is continuously provided near the end portion of the communication plate 30 on the Y2 direction side and over a region corresponding to the first individual flow path 60A along the X direction. The first recovery flow path portion 32 communicates with the second recovery flow path portion 58 provided on the liquid chamber forming substrate 50 to form the first recovery side common liquid chamber 82A.

The communication plate 30 is provided with the first communication flow path 33A, the first communication flow path 33B, the first communication flow path 33C, the second communication flow path 34A, the second communication flow path 34B, the second communication flow path 34C, and the second communication flow path 34D as the flow paths constituting the first individual flow path 60A.

The first communication flow path 33A opens on the Z1 direction side of the communication plate 30 and extends in the Y direction, and one end portion thereof communicates with the first supply flow path portion 31.

The first communication flow path 33B opens on the Z1 direction side of the communication plate 30 and extends in the Y direction to communicate with the first nozzle 21A.

The first communication flow path 33C opens on the Z1 direction side of the communication plate 30 and extends in the Y direction, and one end portion thereof communicates with the first recovery flow path portion 32.

The second communication flow path 34A penetrates the communication plate 30 in the Z direction and communicates the first communication flow path 33A with the first pressure chamber 41.

The second communication flow path 34B penetrates the communication plate 30 in the Z direction and communicates the first pressure chamber 41 with the first communication flow path 33B.

The second communication flow path 34C penetrates the communication plate 30 in the Z direction and communicates the first communication flow path 33B with the second pressure chamber 42.

The second communication flow path 34D penetrates the communication plate 30 in the Z direction and communicates the second pressure chamber 42 with the first communication flow path 33C.

The communication plate 30 is provided with a first bypass flow path portion 35A, a first bypass flow path portion 35B, and a first bypass flow path portion 35C as flow paths constituting the first bypass flow path 91, and is provided with a second bypass flow path portion 36A, a second bypass flow path portion 36B, and a second bypass flow path portion 36C as flow paths constituting the second bypass flow path 92.

The first bypass flow path portion 35A is a recessed portion that opens on the Z1 direction side of the communication plate 30 and extends in the X1 direction from the region A1.

The first bypass flow path portion 35B is a recessed portion that opens on the Z1 direction side of the communication plate 30, couples the first bypass flow path portion 35A and the first bypass flow path portion 35C, and extends in the Y direction.

The first bypass flow path portion 35C is a recessed portion that opens on the Z1 direction side of the communication plate 30 and extends in the X1 direction from the region B1.

The second bypass flow path portion 36A is a recessed portion that opens on the Z1 direction side of the communication plate 30 and extends in the X2 direction from the region A3.

The second bypass flow path portion 36B is a recessed portion that opens on the Z1 direction side of the communication plate 30, couples the second bypass flow path portion 36A and the second bypass flow path portion 36C, and extends in the Y direction.

The second bypass flow path portion 36C is a recessed portion that opens on the Z1 direction side of the communication plate 30 and extends in the X2 direction from the region B3.

For example, the communication plate 30 is manufactured so that a silicon single crystal substrate is processed by using a semiconductor manufacturing technique. However, a material and a manufacturing method of the communication plate 30 are not particularly limited, and any material and manufacturing method can be adopted.

A compliance substrate 70 is provided on a surface of the communication plate 30 on the Z1 direction side. In the present embodiment, the compliance substrate 70 is formed in a shape that surrounds the periphery of the nozzle substrate 20, and has a configuration in which a sealing film 71 made of a flexible thin film and a fixed substrate 72 made of a hard material such as metal are bonded in this order from the Z2 direction side to the Z1 direction.

The compliance substrate 70 closes openings of the first supply flow path portion 31, the first recovery flow path portion 32, the first communication flow path 33A, the first communication flow path 33C, the second communication flow path 34A, the second communication flow path 34D, the first bypass flow path portion 35A, the first bypass flow path portion 35B, the first bypass flow path portion 35C, the second bypass flow path portion 36A, the second bypass flow path portion 36B, and the second bypass flow path portion 36C.

The first communication flow path 33A, the second communication flow path 34A, the second communication flow path 34D, and the first communication flow path 33C are closed by the compliance substrate 70, and the second communication flow path 34B, the first communication flow path 33B, and the second communication flow path 34C are closed by the nozzle substrate 20, so that the first individual flow path 60A is formed.

The first bypass flow path 91 is formed by closing the first bypass flow path portion 35A, the first bypass flow path portion 35B, and the first bypass flow path portion 35C by the compliance substrate 70.

The second bypass flow path 92 is formed by closing the second bypass flow path portion 36A, the second bypass flow path portion 36B, and the second bypass flow path portion 36C by the compliance substrate 70.

A region of the fixed substrate 72 facing each of the first supply flow path portion 31 and the first recovery flow path portion 32 is an opening portion 75 completely removed in the Z direction, which is the thickness direction. A part of the sealing film 71 exposed to the opening portion 75 is a first compliance portion 73 and a second compliance portion 74. The Z1 direction side of the opening portion 75 is closed by the fixing plate 400. That is, a surface of the sealing film 71 facing the Z1 direction, an inner peripheral surface on which the opening portion 75 of the fixed substrate 72 is formed, and a surface of the fixing plate 400 facing the Z2 direction define a compliance space. The compliance space communicates with the atmosphere through an atmospheric communication path (not illustrated). An opening portion penetrating in the thickness direction is not formed in a region of the fixed substrate 72 that faces each of the first bypass flow path portion 35A, the first bypass flow path portion 35B, the first bypass flow path portion 35C, the second bypass flow path portion 36A, the second bypass flow path portion 36B, and the second bypass flow path portion 36C.

The first compliance portion 73 is a portion of the sealing film 71 that seals the opening of the first supply flow path portion 31 on the Z1 direction side. The first compliance portion 73 includes a first surface S1 on the Z2 direction side that defines a part of the first supply side common liquid chamber 81A, and a second surface S2 opposite to the first surface S1 and in contact with the atmosphere, and corresponds to a "supply side flexible member having flexibility". The first compliance portion 73 absorbs the pressure fluctuation of the ink in the first supply side common liquid chamber 81A.

The second compliance portion 74 is a portion of the sealing film 71 that seals the opening of the first recovery flow path portion 32 on the Z1 direction side. The second compliance portion 74 includes a third surface S3 on the Z2 direction side that defines a part of the first recovery side common liquid chamber 82A, and a fourth surface S4 opposite to the third surface S3 and in contact with the atmosphere, and corresponds to a "recovery side flexible member having flexibility". The second compliance portion 74 absorbs the pressure fluctuation of the ink in the first recovery side common liquid chamber 82A.

The liquid chamber forming substrate 50 is provided on the Z2 direction side of the communication plate 30, and is provided with a second supply flow path portion 57 and a second recovery flow path portion 58. By bonding the liquid chamber forming substrate 50, the communication plate 30, and the compliance substrate 70, the first supply flow path portion 31 and the second supply flow path portion 57 communicate with each other, and the first supply side common liquid chamber 81A sealed by the first compliance portion 73 is formed. In addition, the first recovery flow path portion 32 and the second recovery flow path portion 58 communicate with each other, and the first recovery side common liquid chamber 82A sealed by the second compliance portion 74 is formed.

The liquid chamber forming substrate 50 is provided with a fifth inlet path 53A communicating with the second supply flow path portion 57 and a fifth outlet path 54A communicating with the second recovery flow path portion 58. The fifth inlet path 53A communicates with the second inlet path 221A and forms a part of the first supply flow path 83A.

Ink is supplied from the liquid container 2A and the circulation mechanism 500A to the first supply side common liquid chamber 81A via the first inlet 51A. The ink stored in the first recovery side common liquid chamber 82A is recovered in the auxiliary liquid container 503A of the circulation mechanism 500A via the first outlet 52A. In addition, an opening 55 is provided in the central portion of the liquid chamber forming substrate 50, and the pressure chamber substrate 40 is disposed inside the opening 55.

For example, the liquid chamber forming substrate 50 is formed by injection molding of a resin material. However, a material and a manufacturing method of the liquid chamber forming substrate 50 are not particularly limited, and any material and manufacturing method can be adopted.

Here, the flow path resistances of the first bypass flow path 91, the second bypass flow path 92, the first supply side common liquid chamber 81A, and the first recovery side common liquid chamber 82A described above will be described.

A flow path resistance of the first bypass flow path 91 is referred to as Rbp1, and a flow path resistance of the second bypass flow path 92 is referred to as Rbp2. These Rbp1 and Rbp2 are different from each other. In the present embodiment, the flow path length of the first bypass flow path 91 and the flow path length of the second bypass flow path 92 are substantially the same lengths as each other, and a cross-sectional area of the first bypass flow path 91 is formed larger than a cross-sectional area of the second bypass flow path 92. Therefore, the flow path resistance Rbp1 is lower than the flow path resistance Rbp2. As a matter of course, in order to obtain different flow path resistances, the first bypass flow path 91 and the second bypass flow path 92 are not limited to having the same flow path length and different cross-sectional areas. By appropriately setting various factors that affect the flow path resistance, such as the length of the flow path, the path of the flow path, and the cross-sectional shape of the flow path, the flow path resistance of the first bypass flow path 91 and the second bypass flow path 92 can be varied.

A flow path resistance from the first inlet 51A to the end of the first supply side common liquid chamber 81A in the X1 direction is defined as Rα1. A flow path resistance from the first inlet 51A to the end of the first supply side common liquid chamber 81A in the X2 direction is defined as Rβ1. The flow path resistance Rα1 is lower than the flow path resistance Rβ1.

In the present embodiment, the first supply side common liquid chamber 81A has a rectangular cross-sectional shape perpendicular to the X direction, and is formed to continue in substantially the same shape over the X direction. In the first supply side common liquid chamber 81A having such a shape, since the first inlet 51A is disposed in the X1 direction with respect to the center of the first supply side common liquid chamber 81A in the X1 direction, that is, in the region A1, the flow path resistance Rα1 is lower than the flow path resistance Rβ1. As a matter of course, the shape of the first supply side common liquid chamber 81A and the position of the first inlet 51A are not limited to those exemplified. By appropriately setting various factors that affect the flow path resistance, such as the position of the first inlet 51A, the length of the flow path, the path of the flow path, and the cross-sectional shape of the flow path, the flow path resistance Rα1 can be made lower than the flow path resistance Rβ1.

A flow path resistance from the first outlet 52A to the end of the first recovery side common liquid chamber 82A in the X1 direction is defined as Rα2. A flow path resistance from the first outlet 52A to the end of the first recovery side common liquid chamber 82A in the X2 direction is defined as Rβ2. The flow path resistance Rα2 is lower than the flow path resistance Rβ2.

In the present embodiment, the first recovery side common liquid chamber 82A has a rectangular cross-sectional shape perpendicular to the X direction, and is formed to continue in substantially the same shape over the X direction. In the first recovery side common liquid chamber 82A having such a shape, since the first outlet 52A is disposed in the X1 direction with respect to the center of the first recovery side common liquid chamber 82A in the X1 direction, that is, in the region B1, the flow path resistance Rα2 is lower than the flow path resistance Rβ2. As a matter of course, the shape of the first recovery side common liquid chamber 82A and the position of the first outlet 52A are not limited to those exemplified. By appropriately setting various factors that affect the flow path resistance, such as the position of the first outlet 52A, the length of the flow path, the path of the flow path, and the cross-sectional shape of the flow path, the flow path resistance Rα2 can be made lower than the flow path resistance Rβ2.

In addition, the distance from the first inlet 51A in the X1 direction to the end of the first supply side common liquid chamber 81A in the X1 direction is defined as al, and the distance from the first inlet 51A in the X1 direction to the end of the first supply side common liquid chamber 81A in the X2 direction is defined as β1. Similarly, the distance from the first outlet 52A in the X1 direction to the end of the first recovery side common liquid chamber 82A in the X1 direction is defined as α2, and the distance from the first outlet 52A in the X1 direction to the end of the first recovery side common liquid chamber 82A in the X2 direction is defined as β2. The flow path resistance Rbp1 and the flow path resistance Rbp2 preferably satisfy the following equations (1) and (2). ≈ means that the value on the left side is within ±10% of the value on the right side.

$$Rbp1 \approx rbp2 \times \alpha 1/\beta 1 \quad (1)$$

$$Rbp1 \approx rbp2 \times \alpha 2/\beta 2 \quad (2)$$

In the recording head 10 having the above-described configuration, the flow path resistance Rbp1 of the first bypass flow path 91 and the flow path resistance Rbp2 of the second bypass flow path 92 are different from each other, and the flow path resistance Rbp1 is lower than the flow path resistance Rbp2.

The flow path resistance Rα1 from the first inlet 51A to the end of the first supply side common liquid chamber 81A on the X1 direction side is lower than the flow path resistance Rβ1 from the first inlet 51A to the end of the first supply side common liquid chamber 81A on the X2 direction side.

The flow path resistance Rα2 from the first outlet 52A to the end of the first recovery side common liquid chamber 82A on the X1 direction side is lower than the flow path resistance Rβ2 from the first outlet 52A to the end of the first recovery side common liquid chamber 82A on the X2 direction side.

The flow path resistance Rbp1 of the first bypass flow path 91 is lower than the flow path resistance Rbp2 of the second bypass flow path 92.

The recording head 10 satisfying such a relationship of the flow path resistance can reduce the pressure difference between the first supply side common liquid chamber 81A and the first recovery side common liquid chamber 82A, as compared with the recording head of the comparative example, when the same flow rate of ink is circulated in each recording head. The recording head of the comparative example in the present embodiment refers to a recording head in which the flow path resistance Rbp1 of the first bypass flow path 91 and the flow path resistance Rbp2 of the second bypass flow path 92 are the same as each other, and other configurations are the same as that of the recording head 10.

The pressure difference in the first supply side common liquid chamber 81A refers to both the pressure difference between one end and the other end of the first supply side common liquid chamber 81A in the X direction, and the difference between the maximum pressure and the minimum pressure in the first supply side common liquid chamber 81A.

The pressure difference in the first recovery side common liquid chamber 82A refers to both the pressure difference between one end and the other end of the first recovery side common liquid chamber 82A in the X direction, and the difference between the maximum pressure and the minimum pressure in the first recovery side common liquid chamber 82A.

The one end and the other end refer only to the tip ends of the first supply side common liquid chamber 81A and the first recovery side common liquid chamber 82A in the X-direction. For example, for the first supply side common liquid chamber 81A, one end is a tip end on the X1 side of the first supply side common liquid chamber 81A, and the other end is a tip end on the X2 side of the first supply side common liquid chamber 81A.

In both the recording head 10 of the present embodiment and the recording head of the comparative example, the maximum pressure of the first supply side common liquid chamber 81A is a pressure at a position where the first inlet 51A of the first supply side common liquid chamber 81A is provided. In addition, for the recording head of the comparative example, since the flow path resistance Rbp1 of the first bypass flow path 91 and the flow path resistance Rbp2 of the second bypass flow path 92 are the same as each other, the minimum pressure of the first supply side common liquid chamber 81A is the pressure at the position farthest from the first inlet 51A of the first supply side common liquid chamber 81A. That is, the minimum pressure of the first supply side common liquid chamber 81A in the recording head of the comparative example is the pressure at the position of the tip end of the first supply side common liquid chamber 81A on the X2 direction side.

On the other hand, for the recording head 10 of the present embodiment, since the flow path resistance Rbp1 of the first bypass flow path 91 is lower than the flow path resistance Rbp2 of the second bypass flow path 92, the difference between the pressure at the position of the tip end of the first supply side common liquid chamber 81A on the X1 direction side and the pressure at the position of the tip end on the X2 direction side is reduced. Therefore, when the flow path resistance Rbp1 is lower than the flow path resistance Rbp2, according to the ratio of the flow path resistance Rbp1 and the flow path resistance Rbp2, the pressure at the position of the tip end of the first supply side common liquid chamber 81A on the X2 direction side may be lower than the pressure at the position of the tip end on the X1 direction side, the pressure at the position of the tip end of the first supply side common liquid chamber 81A on the X1 direction side may be lower than the pressure at the position of the tip end on the X2 direction side, and the pressure at the position of the tip end of the first supply side common liquid chamber 81A on the X1 direction side may be equal to the pressure at the position of the tip end on the X2 direction side.

Figure 11:
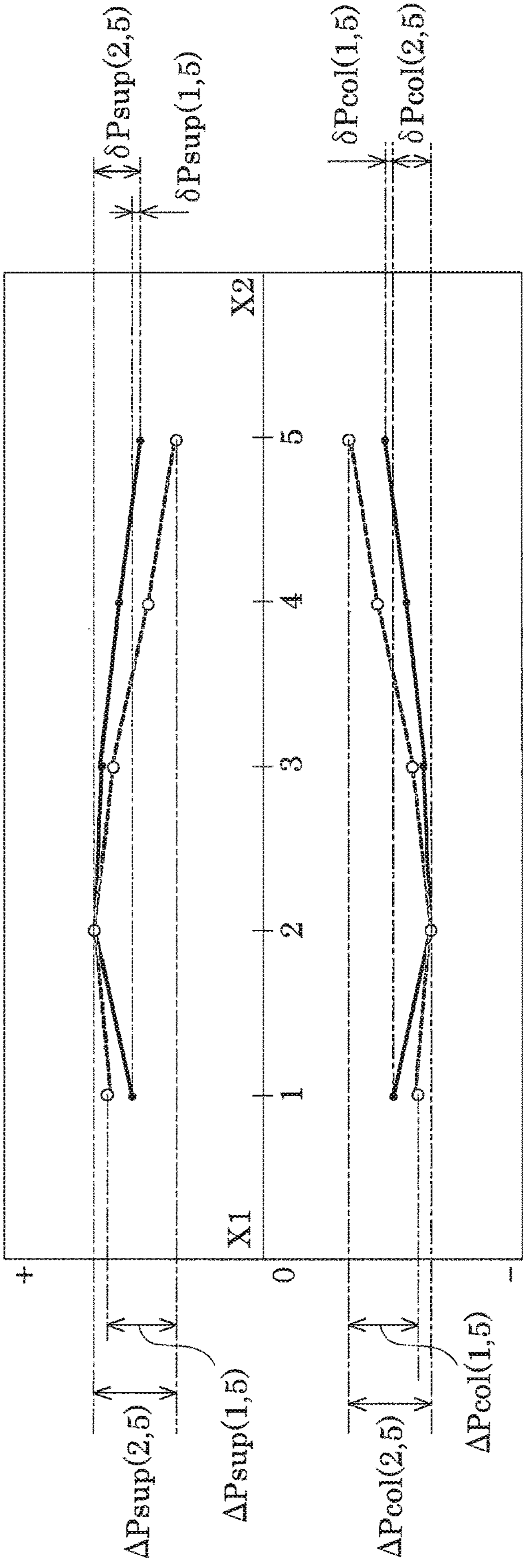
FIG. 11 is a graph illustrating a pressure difference between the recording head according to Embodiment 1 and a recording head of a comparative example.

As illustrated in FIG. 11 described later, in the recording head 10 of the present embodiment, since the pressure at the position of the tip end of the first supply side common liquid chamber 81A on the X2 direction side is lower than the pressure at the position of the tip end on the X1 direction side, the pressure at the position of the tip end of the first supply side common liquid chamber 81A on the X2 direction side is the minimum pressure of the first supply side common liquid chamber 81A. However, for example, by setting the ratio of the flow path resistance Rbp1 to the flow path resistance Rbp2 so that the pressure at the position of the tip end of the first supply side common liquid chamber 81A on the X1 direction side and the pressure at the position of the tip end on the X2 direction side are equal to each other, the pressure at both positions of the tip end of the first supply side common liquid chamber 81A on the X1 direction side and of the tip end on the X2 direction side may be the minimum pressure of the first supply side common liquid chamber 81A. In addition, for example, by setting the ratio of the flow path resistance Rbp1 to the flow path resistance Rbp2 so that the pressure at the position of the tip end of the first supply side common liquid chamber 81A on the X1 direction side is lower than the pressure at the position of the tip end on the X2 direction side, the pressure at the position of the tip end of the first supply side common liquid chamber 81A on the X1 direction side may be the minimum pressure of the first supply side common liquid chamber 81A.

In both the recording head 10 of the present embodiment and the recording head of the comparative example, the minimum pressure of the first recovery side common liquid chamber 82A is a pressure at a position where the first outlet 52A of the first recovery side common liquid chamber 82A is provided. In addition, for the recording head of the comparative example, since the flow path resistance Rbp1 of the first bypass flow path 91 and the flow path resistance Rbp2 of the second bypass flow path 92 are the same as each other, the maximum pressure of the first recovery side common liquid chamber 82A is the pressure at the position farthest from the first outlet 52A of the first recovery side common liquid chamber 82A. That is, the maximum pressure of the first recovery side common liquid chamber 82A in the recording head of the comparative example is the pressure at the position of the tip end of the first recovery side common liquid chamber 82A on the X2 direction side.

On the other hand, for the recording head 10 of the present embodiment, since the flow path resistance Rbp1 of the first bypass flow path 91 is lower than the flow path resistance Rbp2 of the second bypass flow path 92, the difference between the pressure at the position of the tip end of the first recovery side common liquid chamber 82A on the X1 direction side and the pressure at the position of the tip end on the X2 direction side is reduced. Therefore, when the flow path resistance Rbp1 is lower than the flow path resistance Rbp2, according to the ratio of the flow path resistance Rbp1 and the flow path resistance Rbp2, the pressure at the position of the tip end of the first recovery side common liquid chamber 82A on the X2 direction side may be higher than the pressure at the position of the tip end on the X1 direction side, the pressure at the position of the tip end of the first recovery side common liquid chamber 82A on the X1 direction side may be higher than the pressure at the position of the tip end on the X2 direction side, and the pressure at the position of the tip end of the first recovery side common liquid chamber 82A on the X1 direction side may be equal to the pressure at the position of the tip end on the X2 direction side.

As illustrated in FIG. 11 to be described later, in the recording head 10 of the present embodiment, since the pressure at the position of the tip end of the first recovery side common liquid chamber 82A on the X2 direction side is higher than the pressure at the position of the tip end on the X1 direction side, the pressure at the position of the tip end of the first recovery side common liquid chamber 82A on the X2 direction side is the maximum pressure of the first recovery side common liquid chamber 82A. However, for the same reason as that of the first supply side common liquid chamber 81A, depending on the ratio of the flow path resistance Rbp1 and the flow path resistance Rbp2, the pressure at the position of the tip end of the first recovery side common liquid chamber 82A on the X1 direction side may be the maximum pressure of the first recovery side common liquid chamber 82A, and the pressure at both positions of the tip end of the first recovery side common liquid chamber 82A on the X1 direction side and of the tip end on the X2 direction side may be the maximum pressure of first recovery side common liquid chamber 82A.

FIG. 11 illustrates a pressure distribution of the recording head 10 of the present embodiment in the first supply side common liquid chamber 81A and a pressure distribution of the recording head of the comparative example in the first supply side common liquid chamber 81A. The vertical axis in FIG. 11 indicates the pressure. The pressure of the ink in the first supply side common liquid chamber 81A is positive pressure and is illustrated above the horizontal axis. The pressure of the ink in the first recovery side common liquid chamber 82A is negative pressure and is illustrated below the horizontal axis.

The numbers "1" to "5" on the horizontal axis of FIG. 11 indicate the first to fifth positions, which are the positions of the first supply side common liquid chamber 81A and the first recovery side common liquid chamber 82A in the X direction. The first position represents a position which is an end of each of the first supply side common liquid chamber 81A and the first recovery side common liquid chamber 82A in the X1 direction. The fifth position represents a position which is an end of each of the first supply side common liquid chamber 81A and the first recovery side common liquid chamber 82A in the X2 direction. The second position represents the positions of the first inlet 51A and the first outlet 52A in the X direction. The third position and the fourth position represent the positions obtained by dividing the space between the second position and the fifth position into three equal parts.

The pressures of the first supply side common liquid chamber 81A and the first recovery side common liquid chamber 82A of the recording head of the comparative example are indicated by the dashed line, and the pressures of the first supply side common liquid chamber 81A and the first recovery side common liquid chamber 82A of the recording head 10 of the present embodiment are indicated by the solid line.

In the recording head of the comparative example, the flow path resistance Rα1 from the first inlet 51A to the first position and the flow path resistance Rβ1 from the first inlet 51A to the fifth position are the same as those of the recording head 10 of the present embodiment. The same applies to the flow path resistance Rα2 and the flow path resistance Rβ2. In addition, in the recording head of the comparative example, the flow path resistance Rbp1 of the first bypass flow path 91 and the flow path resistance Rbp2 of the second bypass flow path 92 are the same as each other.

The pressure difference between the first supply side common liquid chamber 81A and the first recovery side common liquid chamber 82A in the recording head of such a comparative example is as follows.

The pressure difference between one end and the other end of the first supply side common liquid chamber 81A in the X direction, that is, the difference between the pressure at the first position and the pressure at the fifth position is defined as ΔPsup (1, 5).

The pressure difference between the maximum pressure and the minimum pressure of the first supply side common liquid chamber 81A in the X direction, that is, the difference between the pressure at the second position and the pressure at the fifth position is defined as ΔPsup (2, 5).

The pressure difference between one end and the other end of the first recovery side common liquid chamber 82A in the X direction, that is, the difference between the pressure at the first position and the pressure at the fifth position is defined as ΔPcol (1, 5).

The pressure difference between the maximum pressure and the minimum pressure of the first recovery side common liquid chamber 82A in the X direction, that is, the difference between the pressure at the second position and the pressure at the fifth position is defined as ΔPcol (2, 5).

In the example illustrated in FIG. 11, the pressure at the first position of the first supply side common liquid chamber 81A is 8.7 kPa, the pressure at the second position of the first supply side common liquid chamber 81A is 10 kPa, the pressure at the fifth position of the first supply side common liquid chamber 81A is 6.6 kPa, the pressure at the first position of the first recovery side common liquid chamber 82A is −9.7 kPa, the pressure at the second position of the first recovery side common liquid chamber 82A is −11 kPa, and the pressure at the fifth position of the first recovery side common liquid chamber 82A is −7.6 kPa. Therefore, ΔPsup (1, 5) is 2.1 kPa, ΔPsup (2, 5) is 3.4 kPa, ΔPcol (1, 5) is 2.1 kPa, and ΔPcol (2, 5) is 3.4 kPa.

On the other hand, in the recording head 10 of the present embodiment, the flow path resistance Rα1 from the first inlet 51A to the first position is lower than the flow path resistance Rβ1 from the first inlet 51A to the fifth position. The flow path resistance Rα2 from the first outlet 52A to the first position is lower than the flow path resistance Rβ2 from the first outlet 52A to the fifth position. In addition, unlike the flow path resistance Rbp1 of the first bypass flow path 91 and the flow path resistance Rbp2 of the second bypass flow path 92, the flow path resistance Rbp1 is lower than the flow path resistance Rbp2.

The pressure difference between the first supply side common liquid chamber 81A and the first recovery side common liquid chamber 82A in the recording head 10 of such a present embodiment is as follows.

The pressure difference between one end and the other end of the first supply side common liquid chamber 81A in the X direction, that is, the difference between the pressure at the first position and the pressure at the fifth position is defined as δPsup (1, 5).

The pressure difference between the maximum pressure and the minimum pressure of the first supply side common liquid chamber 81A in the X direction, that is, the difference between the pressure at the second position and the pressure at the fifth position is defined as δPsup (2, 5).

The pressure difference between one end and the other end of the first recovery side common liquid chamber 82A in the X direction, that is, the difference between the pressure at the first position and the pressure at the fifth position is defined as δPcol (1, 5).

The pressure difference between the maximum pressure and the minimum pressure of the first recovery side common liquid chamber 82A in the X direction, that is, the difference between the pressure at the second position and the pressure at the fifth position is defined as δPcol (2, 5).

In the example illustrated in FIG. 11, the pressure at the first position of the first supply side common liquid chamber 81A is 8.2 kPa, the pressure at the second position of the first supply side common liquid chamber 81A is 10 kPa, the pressure at the fifth position of the first supply side common liquid chamber 81A is 8.1 kPa, the pressure at the first position of the first recovery side common liquid chamber 82A is −9.2 kPa, the pressure at the second position of the first recovery side common liquid chamber 82A is −11 kPa, and the pressure at the fifth position of the first recovery side common liquid chamber 82A is −9.1 kPa. Therefore, δPsup (1, 5) is 0.1 kPa, δPsup (2, 5) is 1.9 kPa, δPcol (1, 5) is 0.1 kPa, and δPcol (2, 5) is 1.9 kPa.

As illustrated in FIG. 11, in the recording head of the comparative example, the first inlet 51A is not disposed at the center of the first supply side common liquid chamber 81A in the X direction, and is provided in the region A1 on the X1 direction side. Therefore, in the first supply side common liquid chamber 81A, the pressure of the ink decreases as separating from the second position where the pressure is the highest in the X2 direction.

On the other hand, by providing the first bypass flow path 91 and the second bypass flow path 92 in which the flow path resistance Rbp1 is lower than the flow path resistance Rbp2, as illustrated in FIG. 11, in the recording head 10 of the present embodiment, although the pressure of the ink decreases separating from the second position in the X2 direction even in the first supply side common liquid chamber 81A, the degree of decrease is lower than that of the recording head of the comparative example. This is because the flow path resistance Rbp1 is lower than the flow path resistance Rbp2, and thus the flow rate of the ink flowing from the first inlet 51A to the second bypass flow path 92 decreases, so that the pressure loss of the ink flowing from the first inlet 51A to the second bypass flow path 92 is reduced, and thus the pressure at the fifth position of the first supply side common liquid chamber 81A increases.

In addition, in the recording head 10 of the present embodiment, although the pressure of the ink decreases as separating from the second position in the X1 direction in the first supply side common liquid chamber 81A, and the degree of the decrease is higher than that of the recording head of the comparative example, the pressure difference described above is reduced. This is because the flow path resistance Rbp1 is lower than the flow path resistance Rbp2, and thus the flow rate of the ink flowing from the first inlet 51A to the first bypass flow path 91 increases, so that the pressure loss of the ink flowing from the first inlet 51A to the first bypass flow path 91 is increased, and thus the pressure at the first position of the first supply side common liquid chamber 81A decreases.

In summary, the pressure differences between the recording head 10 of the present embodiment and the recording head of the comparative example in the first supply side common liquid chamber 81A have the following relationship. δPsup (1, 5) is lower than ΔPsup (1, 5) and δPsup (2, 5) is lower than ΔPsup (2, 5).

The same applies to the pressure difference of the first recovery side common liquid chamber 82A. In the recording head of the comparative example, the first outlet 52A is not disposed at the center of the first recovery side common liquid chamber 82A in the X direction, and is provided in the region B1 on the X1 direction side. Therefore, in the first recovery side common liquid chamber 82A, the pressure of the ink increases as separating from the second position where the pressure is the highest in the X2 direction.

On the other hand, in the recording head 10 of the present embodiment, although the pressure of the ink increases as separating from the second position in the X2 direction in the first recovery side common liquid chamber 82A, the degree of increase is lower than that of the recording head of the comparative example. This is because the flow path resistance Rbp1 is lower than the flow path resistance Rbp2, and thus the flow rate of the ink flowing from the second bypass flow path 92 to the first outlet 52A is reduced, so that the pressure loss of the ink flowing from the second bypass flow path 92 to the first outlet 52A is reduced, and thus the pressure at the fifth position of the first recovery side common liquid chamber 82A is reduced.

In addition, in the recording head 10 of the present embodiment, although the pressure of the ink increases as separating from the second position in the X1 direction in the first recovery side common liquid chamber 82A, and the degree of increase is higher than that of the recording head of the comparative example, the pressure difference described above is reduced. This is because the flow path resistance Rbp1 is lower than the flow path resistance Rbp2, and thus the flow rate of the ink flowing from the first bypass flow path 91 toward the first outlet 52A increases, so that the pressure loss of the ink flowing from the first bypass flow path 91 toward the first outlet 52A increases, and thus the pressure at the first position of the first recovery side common liquid chamber 82A increases.

In summary, the pressure differences between the recording head 10 of the present embodiment and the recording head of the comparative example in the first recovery side common liquid chamber 82A have the following relationship. δPcol (1, 5) is lower than ΔPcol (1, 5) and δPcol (2, 5) is lower than ΔPcol (2, 5).

In a recording head in the related art as described in JP-A-2022-023542, the first inlet 51A is disposed at the center in the X direction of the first supply side common liquid chamber 81A, and the first outlet 52A is disposed at the center in the X direction of the first recovery side common liquid chamber 82A.

However, due to the convenience of routing the first supply flow path 83A for supplying ink to the first inlet 51A and the first recovery flow path 84A for recovering ink from the first outlet 52A, the first inlet 51A may be disposed in the X1 direction with respect to the center of the first supply side common liquid chamber 81A in the X1 direction, and the first outlet 52A may be disposed in the X1 direction with respect to the center of the first recovery side common liquid chamber 82A in the X1 direction.

In such a case, when the flow path resistance Rbp1 of the first bypass flow path 91 and the flow path resistance Rbp2 of the second bypass flow path 92 are the same as each other as in the recording head of the comparative example described above, as illustrated by the dashed line in FIG. 11, each of the pressure differences in the first supply side common liquid chamber 81A and the pressure difference in the first recovery side common liquid chamber 82A are increased.

When the pressure difference is increased as described above, there is a possibility that the flow rates of the ink supplied to each of the plurality of first individual flow paths 60A may vary, and printing may be uneven.

For example, it is assumed that the pressure of the first supply side common liquid chamber 81A at the second position is 10 kPa and the pressure of the first recovery side common liquid chamber 82A at the second position is −11 kPa. An ink having a flow rate corresponding to 21 kPa, which is the difference in pressure between these common liquid chambers, flows into the first individual flow path 60A near the second position.

On the other hand, it is assumed that the pressure of the first supply side common liquid chamber 81A at the fifth position is 6.6 kPa and the pressure of the first recovery side common liquid chamber 82A at the fifth position is −7.6 kPa. An ink having a flow rate corresponding to 14.2 kPa, which is the difference in pressure between these common liquid chambers, flows into the first individual flow path 60A near the fifth position.

As described above, since the ink flows into the first individual flow path 60A near the second position with a flow rate corresponding to the pressure difference of 21 kPa and into the first individual flow path 60A near the fifth position with a flow rate corresponding to the pressure difference of 14.2 kPa, the variation in the flow rate of the ink for each of the first individual flow paths 60A is relatively large.

That is, when the pressure difference in the first supply side common liquid chamber 81A and the pressure difference in the first recovery side common liquid chamber 82A are large, there is also a large difference in the amount of ink flowing into the first individual flow path 60A near the second position and the fifth position separated in the X direction. Therefore, due to the pressure difference described above, there is a possibility that the flow rates of the ink to the plurality of first individual flow paths 60A may vary, and printing may be uneven.

On the other hand, in the recording head 10 of the present embodiment, the flow path resistance Rbp1 of the first bypass flow path 91 on the X1 direction side near the first inlet 51A is lower than the flow path resistance Rbp2 of the second bypass flow path 92 on the X2 direction side far from the first inlet 51A.

With such a configuration, in the recording head 10 of the present embodiment, each of the pressure differences in the first supply side common liquid chamber 81A and the pressure difference in the first recovery side common liquid chamber 82A can be reduced, as compared with the recording head in which the flow path resistance Rbp1 and the flow path resistance Rbp2 are the same as each other.

As a result, it is possible to alleviate the variation in the flow rate flowing for each of the first nozzles 21A, and to suppress the variation in the viscosity of the liquid for each of the first nozzles 21A.

For example, it is assumed that the pressure of the first supply side common liquid chamber 81A at the second position is 10 kPa and the pressure of the first recovery side common liquid chamber 82A at the second position is −11 kPa. An ink having a flow rate corresponding to 21 kPa, which is the difference in pressure between these common liquid chambers, flows into the first individual flow path 60A near the second position.

On the other hand, in the present embodiment, since the above-described pressure difference is alleviated, it is assumed that the pressure of the first supply side common liquid chamber 81A at the fifth position is a value close to the pressure at the second position, for example, 8.1 kPa, and the pressure of the first recovery side common liquid chamber 82A at the fifth position is −9.1 kPa. An ink having a flow rate corresponding to 17.2 kPa, which is the difference in pressure between these common liquid chambers, flows into the first individual flow path 60A near the fifth position.

Since the ink flows into the first individual flow path 60A near the second position with a flow rate corresponding to the pressure difference of 21 kPa and into the first individual flow path 60A near the fifth position with a flow rate corresponding to the pressure difference of 17.2 kPa, the variation in the flow rate of the ink supplied for each of the first individual flow paths 60A is small, as compared with the recording head of the comparative example in which the pressure difference is not alleviated.

As described above, in the recording head 10 of the present embodiment, since the pressure difference in the first supply side common liquid chamber 81A and the pressure difference in the first recovery side common liquid chamber 82A are alleviated, the variation in the flow rate of ink flowing into each first individual flow path 60A, that is, each first nozzle 21A can be alleviated.

The opening of each of the first supply side common liquid chamber 81A and the first recovery side common liquid chamber 82A on the Z1 direction is closed by the first compliance portion 73 and the second compliance portion 74. Since the first compliance portion 73 and the second compliance portion 74 have flexibility, the pressure fluctuation of the ink is absorbed. In the recording head 10 of the present embodiment, since the pressure difference in the first supply side common liquid chamber 81A is alleviated by defining the flow path resistance as described above, the bending behavior of the first compliance portion 73 is also made uniform in the X direction, which is the longitudinal direction of the first supply side common liquid chamber 81A, and the printing unevenness as described above is further suppressed. The same applies to the second compliance portion 74 in this respect.

Here, the disposition of the head chip 100A and the head chip 100B will be described. As illustrated in FIGS. 3 and 4, when viewed in the Y direction, which is the transport direction of the medium S facing the recording head 10, in the recording head 10, end portions TA of the first nozzle row 22A on the X2 direction side and end portions TB of the second nozzle row 22B on the X1 direction side overlap each other. Alternatively, although not particularly illustrated, an end portion of the first nozzle row 22A in the X1 direction and an end portion of the second nozzle row 22B in the X2 direction may overlap each other.

Temporarily, in the above head chip 100A and the head chip 100B, it is assumed that the flow path resistances of the first bypass flow path 91 and the second bypass flow path 92 of the head chip 100A are the same as each other, and the flow path resistances of the third bypass flow path 93 and the fourth bypass flow path 94 of the head chip 100B are the same as each other. That is, it is assumed that the pressure difference is the same as that of the recording head of the comparative example illustrated in FIG. 11.

It is assumed that the head chip 100A is disposed so that the end of the first supply side common liquid chamber 81A in the X2 direction is on the end portion TA side, and the head chip 100B is disposed so that the end of the second supply side common liquid chamber 81B in the X1 direction is on the end portion TB side.

In such a disposition, the vicinity of the fifth position of the head chip 100A is located at the end portion TA, and the vicinity of the first position of the head chip 100B is located at the end portion TB. Therefore, the pressure difference between the first supply side common liquid chamber 81A and the first recovery side common liquid chamber 82A and the pressure difference between the second supply side common liquid chamber 81B and the second recovery side common liquid chamber 82B are significantly different from each other, at the end portion TA and the end portion TB that overlap when viewed in the Y direction. When this difference is significantly different, there is a possibility that printing unevenness in the vicinity of the end portion TA and the end portion TB, which are joints between the first nozzle row 22A and the second nozzle row 22B, may increase.

Therefore, in order to suppress printing unevenness, for example, it is necessary to invert the head chip 100B by 180 degrees around the Z direction. This is because the vicinity of the fifth position of the head chip 100A is located at the end portion TA, and the vicinity of the fifth position of the head chip 100B is located at the end portion TB to reduce the pressure difference between the first supply side common liquid chamber 81A and the first recovery side common liquid chamber 82A and the pressure difference between the second supply side common liquid chamber 81B and the second recovery side common liquid chamber 82B, at the end portion TA and the end portion TB that overlap when viewed in the Y direction.

On the other hand, in the recording head 10 of the present embodiment, the flow path resistance is defined as follows.

The flow path resistance Rα1 from the first inlet 51A to the end of the first supply side common liquid chamber 81A in the X1 direction is lower than the flow path resistance Rβ1 from the first inlet 51A to the end of the first supply side common liquid chamber 81A in the X2 direction, and the flow path resistance Rα2 from the first outlet 52A to the end of the first recovery side common liquid chamber 82A in the X1 direction is lower than the flow path resistance Rβ2 from the first outlet 52A to the end of the first recovery side common liquid chamber 82A in the X2 direction. The flow path resistance Rbp1 of the first bypass flow path 91 is lower than the flow path resistance Rbp2 of the second bypass flow path 92.

The flow path resistance Rα1 from the second inlet 51B to the end of the second supply side common liquid chamber 81B in the X1 direction is lower than the flow path resistance Rβ1 from the second inlet 51B to the end of the second supply side common liquid chamber 81B in the X2 direction, and the flow path resistance Rα2 from the second outlet 52B to the end of the second recovery side common liquid chamber 82B in the X1 direction is lower than the flow path resistance Rβ2 from the second outlet 52B to the end of the second recovery side common liquid chamber 82B in the X2 direction. The flow path resistance Rbp3 of the third bypass flow path 93 is lower than the flow path resistance Rbp4 of the fourth bypass flow path 94.

With such a flow path resistance, in the recording head 10 of the present embodiment, each of the pressure differences among the first supply side common liquid chamber 81A, the first recovery side common liquid chamber 82A, the second supply side common liquid chamber 81B, and the second recovery side common liquid chamber 82B can be reduced. Therefore, when the head chip 100A and the head chip 100B are disposed such that the end portion TA and the end portion TB overlap each other in the Y direction as described above, it is possible to eliminate the need to invert either the head chip 100A or the head chip 100B in order to suppress the printing unevenness at the end portion TA and the end portion TB that are joints of the adjacent first nozzle row 22A and second nozzle row 22B.

When the flow path resistance Rα1 from the second inlet 51B to the end of the second supply side common liquid chamber 81B in the X1 direction is higher than the flow path resistance Rβ1 from the second inlet 51B to the end of the second supply side common liquid chamber 81B in the X2 direction, and the flow path resistance Rα2 from the second outlet 52B to the end of the second recovery side common liquid chamber 82B in the X1 direction is higher than the flow path resistance Rβ2 from the second outlet 52B to the end of the second recovery side common liquid chamber 82B in the X2 direction, it is preferable that the flow path resistance Rbp3 of the third bypass flow path 93 is higher than the flow path resistance Rbp4 of the fourth bypass flow path 94. In other words, when the second inlet 51B is disposed in the X2 direction with respect to the center of the second supply side common liquid chamber 81B in the X1 direction, and the second outlet 52B is disposed in the X2 direction with respect to the center of the second recovery side common liquid chamber 82B in the X1 direction, it is preferable that the flow path resistance Rbp3 of the third bypass flow path 93 is higher than the flow path resistance Rbp4 of the fourth bypass flow path 94. Even in such a case, when the head chip 100A and the head chip 100B are disposed such that the end portion TA and the end portion TB overlap each other in the Y direction as described above, it is possible to eliminate the need to invert either the head chip 100A or the head chip 100B in order to suppress the printing unevenness at the end portion TA and the end portion TB that are joints of the adjacent first nozzle row 22A and second nozzle row 22B.

In addition, in the present embodiment, although the head chip 100A and the head chip 100B are disposed so that the end portion TA of the first nozzle row 22A of the head chip 100A on the X2 direction side and the end portion TB of the second nozzle row 22B of the head chip 100B on the X1 direction side overlap each other when viewed in the transport direction of the medium S, the configuration is not limited thereto. For example, the head chip 100A and the head chip 100B may be disposed so that the end portion of the first nozzle row 22A of the head chip 100A on the X1 direction side and the end portion of the second nozzle row 22B of the head chip 100B on the X2 direction side overlap each other when viewed in the transport direction of the medium S. In this case, the end portion of the first nozzle row 22A of the head chip 100A on the X1 direction side is the end portion TA which is a joint, and the end portion of the second nozzle row 22B of the head chip 100B on the X2 direction is the end portion TB which is a joint.

Embodiment 2

Figure 12:
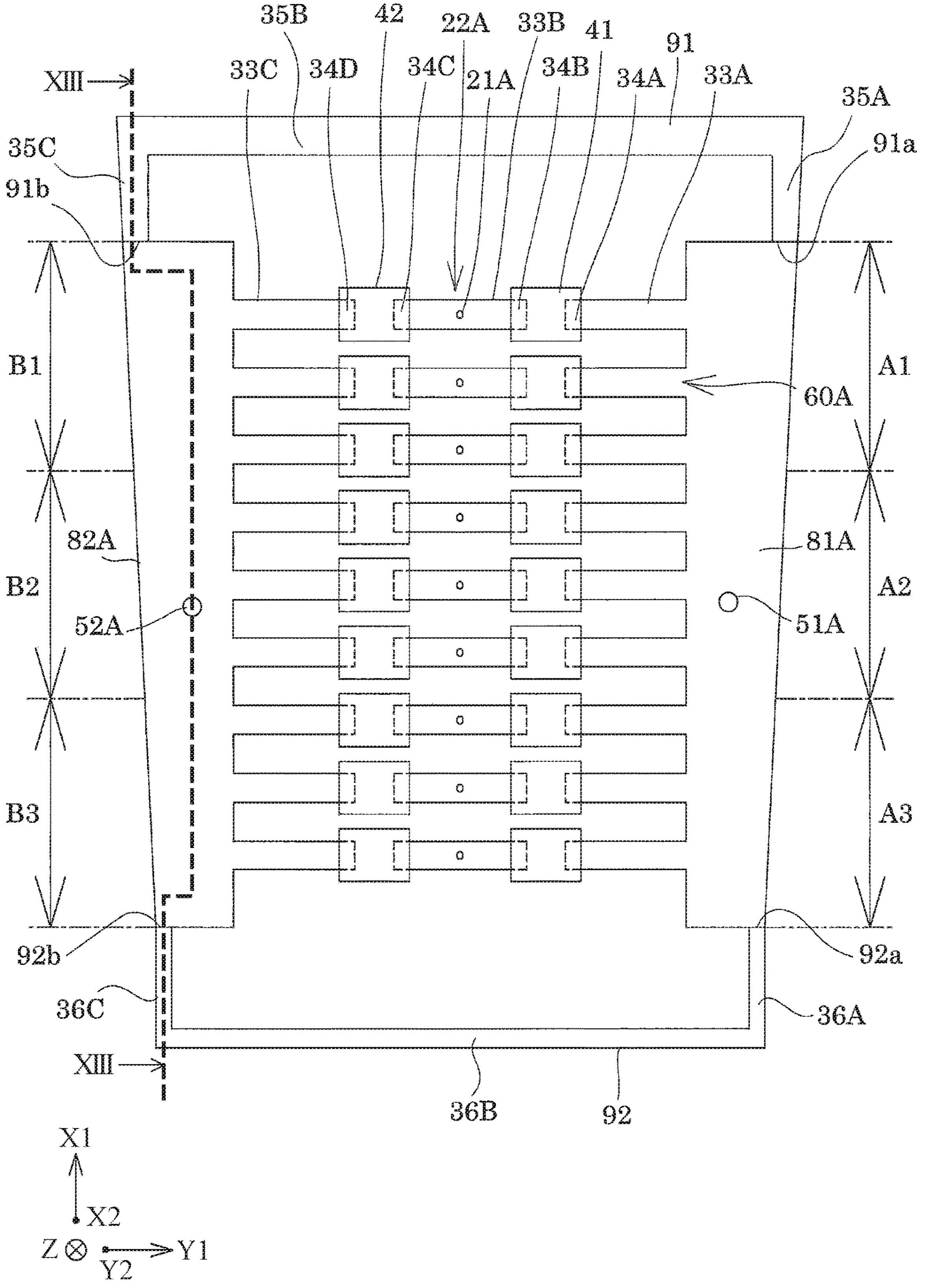
FIG. 12 is a plan view of a flow path of ink formed in a head chip according to Embodiment 2.
Figure 13:
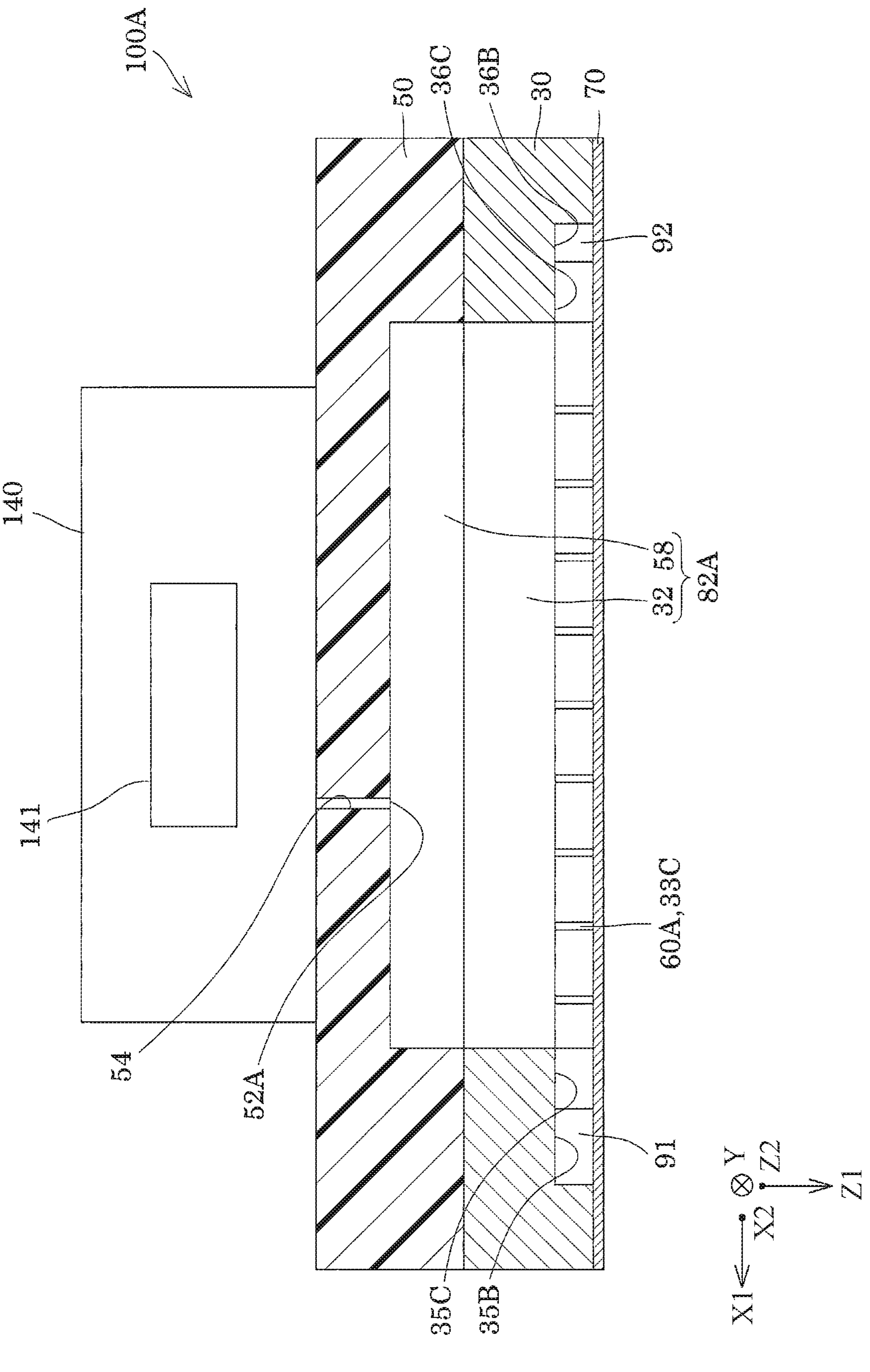
FIG. 13 is a cross-sectional view taken along line XIII-XIII in FIG. 12.

FIG. 12 is a plan view of a flow path of the ink formed in the head chip 100, and FIG. 13 is a cross-sectional view taken along line XIII-XIII in FIG. 12. The same members as those in Embodiment 1 are designated by the same reference numerals, and redundant descriptions will be omitted. In addition, although the following description is the description of the head chip 100A, since the same applies to the head chip 100B, redundant descriptions will be omitted.

The first inlet 51A is disposed at the center of the first supply side common liquid chamber 81A in the X1 direction, and the first outlet 52A is disposed at the center of the first recovery side common liquid chamber 82A in the X1 direction. In the present embodiment, the first inlet 51A is disposed at the center of the first supply side common liquid chamber 81A in the X1 direction, and the first outlet 52A is disposed at the center of the first recovery side common liquid chamber 82A in the X1 direction.

The center of the first supply side common liquid chamber 81A in the X1 direction is a central region when the first supply side common liquid chamber 81A is divided into three parts in the X1 direction, which is the longitudinal direction, more preferably a central region when the first supply side common liquid chamber 81A is divided into five parts in the X1 direction, and further preferably a central region when the first supply side common liquid chamber 81A is divided into ten parts in the X1 direction.

The center of the first recovery side common liquid chamber 82A in the X1 direction is a central region when the first recovery side common liquid chamber 82A is divided into three parts in the X1 direction, which is the longitudinal direction, more preferably a central region when the first recovery side common liquid chamber 82A is divided into five parts in the X1 direction, and further preferably a central region when the first recovery side common liquid chamber 82A is divided into ten parts in the X1 direction.

An average flow path resistance per unit length from the first inlet 51A to the end of the first supply side common liquid chamber 81A in the X1 direction is defined as γ1. An average flow path resistance per unit length from the first inlet 51A to the end of the first supply side common liquid chamber 81A in the X2 direction is defined as 51. The flow path resistance γ1 is lower than the flow path resistance 51.

As an example of satisfying the relationship between the flow path resistance γ1 and the flow path resistance 51, in the first supply side common liquid chamber 81A of the present embodiment is formed so that the cross-sectional shape perpendicular to the X direction changes over the X direction. That is, the first supply side common liquid chamber 81A is formed so that the cross-sectional shape expands from the X2 direction to the X1 direction.

An average flow path resistance per unit length from the first outlet 52A to the end of the first recovery side common liquid chamber 82A in the X1 direction is defined as γ2. An average flow path resistance per unit length from the first outlet 52A to the end of the first recovery side common liquid chamber 82A in the X2 direction is defined as 52. The flow path resistance γ2 is lower than the flow path resistance 52.

As an example of satisfying the relationship between the flow path resistance γ2 and the flow path resistance 52, the first recovery side common liquid chamber 82A of the present embodiment is formed so that the cross-sectional shape perpendicular to the X direction changes over the X direction. That is, the first recovery side common liquid chamber 82A is formed so that the cross-sectional shape expands from the X2 direction to the X1 direction.

As a matter of course, the shapes of the first supply side common liquid chamber 81A and the first recovery side common liquid chamber 82A are not limited to those exemplified. By appropriately setting various factors that affect the flow path resistance, such as the length of the flow path, the path of the flow path, and the cross-sectional shape of the flow path, the flow path resistance γ1 and the flow path resistance γ2 can be made lower than the flow path resistance δ1 and the flow path resistance δ2.

Similar to Embodiment 1, the flow path resistance Rbp1 of the first bypass flow path 91 is lower than the flow path resistance Rbp2 of the second bypass flow path 92. In addition, the flow path resistance Rbp1 and the flow path resistance Rbp2 preferably satisfy the following equations (3) and (4). ≈ means that the value on the left side is within ±10% of the value on the right side.

$$Rbp1 \approx rbp2 \times \gamma 1/\delta 1 \quad (1)$$

$$Rbp1 \approx rbp2 \times \gamma 2/\delta 2 \quad (1)$$

The average flow path resistance γ1 per unit length from the first inlet 51A to the end of the first supply side common liquid chamber 81A on the X1 direction side is lower than the average flow path resistance 51 per unit length from the first inlet 51A to the end of the first supply side common liquid chamber 81A on the X2 direction side.

The average flow path resistance γ2 per unit length from the first outlet 52A to the end of the first recovery side common liquid chamber 82A on the X1 direction side is lower than the average flow path resistance 52 per unit length from the first outlet 52A to the end of the first recovery side common liquid chamber 82A on the X2 direction side.

That is, the flow path resistance from the first inlet 51A to the end of the first supply side common liquid chamber 81A on the X1 direction side is lower than the flow path resistance from the first inlet 51A to the end of the first supply side common liquid chamber 81A on the X2 direction side. The flow path resistance from the first outlet 52A to the end of the first recovery side common liquid chamber 82A on the X1 direction side is lower than the flow path resistance from the first outlet 52A to the end of the first recovery side common liquid chamber 82A on the X2 direction side.

The flow path resistance Rbp1 of the first bypass flow path 91 is lower than the flow path resistance Rbp2 of the second bypass flow path 92.

The recording head 10 satisfying such a relationship of the flow path resistance can reduce the pressure difference between the first supply side common liquid chamber 81A and the first recovery side common liquid chamber 82A, as compared with the recording head of the comparative example, when the same flow rate of ink is circulated in each recording head. The recording head of the comparative example in the present embodiment refers to a recording head in which the flow path resistance Rbp1 of the first bypass flow path 91 and the flow path resistance Rbp2 of the second bypass flow path 92 are the same as each other, and other configurations are the same as that of the recording head 10 of the present embodiment.

Figure 14:
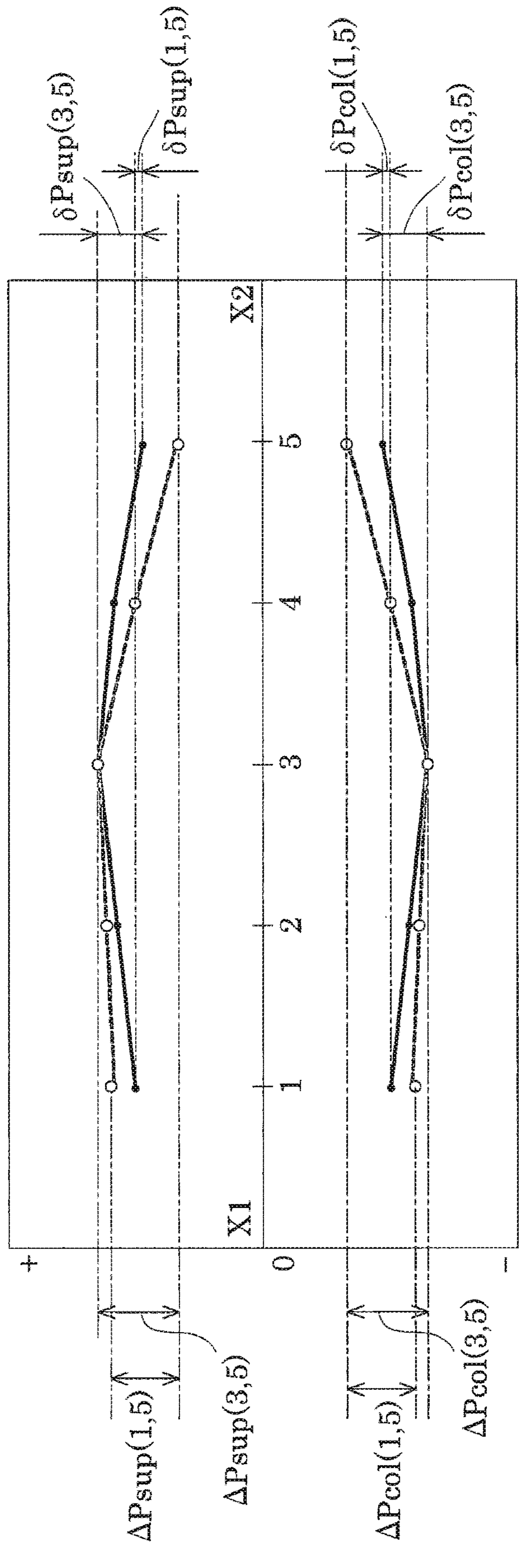
FIG. 14 is a graph illustrating a pressure difference between the recording head according to Embodiment 2 and a recording head of a comparative example.

FIG. 14 illustrates a pressure distribution of the recording head 10 of the present embodiment in the first supply side common liquid chamber 81A and a pressure distribution of the recording head of the comparative example in the first supply side common liquid chamber 81A. The vertical axis in FIG. 14 indicates the pressure. The pressure of the ink in the first supply side common liquid chamber 81A is positive pressure and is illustrated above the horizontal axis. The pressure of the ink in the first recovery side common liquid chamber 82A is negative pressure and is illustrated below the horizontal axis.

The numbers "1" to "5" on the horizontal axis of FIG. 14 indicate the first to fifth positions, which are the positions of the first supply side common liquid chamber 81A and the first recovery side common liquid chamber 82A in the X direction. The first position represents a position which is an end of each of the first supply side common liquid chamber 81A and the first recovery side common liquid chamber 82A in the X1 direction. The fifth position represents a position which is an end of each of the first supply side common liquid chamber 81A and the first recovery side common liquid chamber 82A in the X2 direction. The third position represents the positions of the first inlet 51A and the first outlet 52A in the X direction. The second position represents a position obtained by dividing the space between the first position and the third position into two equal parts. The fourth position represents a position obtained by dividing the space between the third position and the fifth position into two equal parts.

The pressures of the first supply side common liquid chamber 81A and the first recovery side common liquid chamber 82A of the recording head of the comparative example are indicated by the dashed line, and the pressures of the first supply side common liquid chamber 81A and the first recovery side common liquid chamber 82A of the recording head 10 of the present embodiment are indicated by the solid line.

In the recording head of the comparative example, the flow path resistance Rα1 from the first inlet 51A to the first position and the flow path resistance Rβ1 from the first inlet 51A to the fifth position are the same as those of the recording head 10 of the present embodiment. The same applies to the flow path resistance Rα2 and the flow path resistance Rβ2. In addition, in the recording head of the comparative example, the flow path resistance Rbp1 of the first bypass flow path 91 and the flow path resistance Rbp2 of the second bypass flow path 92 are the same as each other.

The maximum pressure and the minimum pressure of the first supply side common liquid chamber 81A in the recording head 10 of the present embodiment and the recording head of the comparative example are as follows. The maximum pressure of the first supply side common liquid chamber 81A in the recording head 10 of the present embodiment and the recording head of the comparative example is a pressure at a position where the first inlet 51A of the first supply side common liquid chamber 81A is provided. In the recording head of the comparative example, the first inlet 51A is located at the center of the first supply side common liquid chamber 81A in the X direction, but the cross-sectional shape changes so as to increase from the X2 direction to the X1 direction. Therefore, the pressures at positions of both ends of the first supply side common liquid chamber 81A are different from each other, and the pressure at the fifth position, which is the position of the tip end of the first supply side common liquid chamber 81A on the X2 direction side, is the minimum pressure.

On the other hand, in the recording head 10 of the present embodiment, since the flow path resistance Rbp1 is lower than the flow path resistance Rbp2, the difference between the pressure at the first position and the pressure at the fifth position of the first supply side common liquid chamber 81A is small. Therefore, similarly to Embodiment 1, according to the ratio of the flow path resistance Rbp1 and the flow path resistance Rbp2, any of the pressure at the first position, the pressure at the fifth position, and the pressures at both the first and fifth positions of the first supply side common liquid chamber 81A is the minimum pressure of the first supply side common liquid chamber 81A. In the present embodiment, the pressure at the fifth position of the first supply side common liquid chamber 81A is the minimum pressure of the first supply side common liquid chamber 81A.

The maximum pressure and the minimum pressure of the first recovery side common liquid chamber 82A in the recording head 10 of the present embodiment and the recording head of the comparative example are as follows. The minimum pressure of the first recovery side common liquid chamber 82A in the recording head 10 of the present embodiment and the recording head of the comparative example is a pressure at a position where the first outlet 52A of the first recovery side common liquid chamber 82A is provided. In the recording head of the comparative example, the first outlet 52A is located at the center of the first recovery side common liquid chamber 82A in the X direction, but the cross-sectional shape changes so as to increase from the X2 direction to the X1 direction. Therefore, the pressures at positions of both ends of the first recovery side common liquid chamber 82A are different from each other, and the pressure at the fifth position, which is the position of the tip end of the first recovery side common liquid chamber 82A on the X2 direction side, is the maximum pressure.

On the other hand, in the recording head 10 of the present embodiment, since the flow path resistance Rbp1 is lower than the flow path resistance Rbp2, the difference between the pressure at the first position and the pressure at the fifth position of the first recovery side common liquid chamber 82A is small. Therefore, similarly to Embodiment 1, according to the ratio of the flow path resistance Rbp1 and the flow path resistance Rbp2, any of the pressure at the first position, the pressure at the fifth position, and the pressures at both the first and fifth positions of the first recovery side common liquid chamber 82A is the maximum pressure of the first recovery side common liquid chamber 82A. In the present embodiment, the pressure at the fifth position of the first recovery side common liquid chamber 82A is the maximum pressure of the first recovery side common liquid chamber 82A.

The pressure difference between the first supply side common liquid chamber 81A and the first recovery side common liquid chamber 82A in the recording head of such a comparative example is as follows.

The pressure difference between one end and the other end of the first supply side common liquid chamber 81A in the X direction, that is, the difference between the pressure at the first position and the pressure at the fifth position is defined as ΔPsup (1, 5).

The pressure difference between the maximum pressure and the minimum pressure of the first supply side common liquid chamber 81A in the X direction, that is, the difference between the pressure at the third position and the pressure at the fifth position is defined as ΔPsup (3, 5).

The pressure difference between one end and the other end of the first recovery side common liquid chamber 82A in the X direction, that is, the difference between the pressure at the first position and the pressure at the fifth position is defined as ΔPcol (1, 5).

The pressure difference between the maximum pressure and the minimum pressure of the first recovery side common liquid chamber 82A in the X direction, that is, the difference between the pressure at the third position and the pressure at the fifth position is defined as ΔPcol (3, 5).

On the other hand, in the recording head 10 of the present embodiment, the flow path resistance Rα1 from the first inlet 51A to the first position is lower than the flow path resistance Rβ1 from the first inlet 51A to the fifth position. The flow path resistance Rα2 from the first outlet 52A to the first position is lower than the flow path resistance Rβ2 from the first outlet 52A to the fifth position. In addition, unlike the flow path resistance Rbp1 of the first bypass flow path 91 and the flow path resistance Rbp2 of the second bypass flow path 92, the flow path resistance Rbp1 is lower than the flow path resistance Rbp2.

The pressure difference between the first supply side common liquid chamber 81A and the first recovery side common liquid chamber 82A in the recording head 10 of such a present embodiment is as follows.

The pressure difference between one end and the other end of the first supply side common liquid chamber 81A in the X direction, that is, the difference between the pressure at the first position and the pressure at the fifth position is defined as δPsup (1, 5).

The pressure difference between the maximum pressure and the minimum pressure of the first supply side common liquid chamber 81A in the X direction, that is, the difference between the pressure at the third position and the pressure at the fifth position is defined as δPsup (3, 5).

The pressure difference between one end and the other end of the first recovery side common liquid chamber 82A in the X direction, that is, the difference between the pressure at the first position and the pressure at the fifth position is defined as δPcol (1, 5).

The pressure difference between the maximum pressure and the minimum pressure of the first recovery side common liquid chamber 82A in the X direction, that is, the difference between the pressure at the third position and the pressure at the fifth position is defined as δPcol (3, 5).

As illustrated in FIG. 14, in the recording head of the comparative example, the first inlet 51A is disposed at the center of the region A2 in the X direction of the first supply side common liquid chamber 81A. In the first supply side common liquid chamber 81A, the pressure of the ink decreases as separating from the third position where the pressure is the highest in the X2 direction.

On the other hand, by providing the first bypass flow path 91 and the second bypass flow path 92 in which the flow path resistance Rbp1 is lower than the flow path resistance Rbp2, as illustrated in FIG. 14, in the recording head 10 of the present embodiment, although the pressure of the ink decreases separating from the third position in the X2 direction even in the first supply side common liquid chamber 81A, the degree of decrease is lower than that of the recording head of the comparative example.

In addition, in the recording head 10 of the present embodiment, although the pressure of the ink decreases as separating from the third position in the X1 direction in the first supply side common liquid chamber 81A, and the degree of the decrease is higher than that of the recording head of the comparative example, the pressure difference described above is reduced.

In summary, the pressure differences between the recording head 10 of the present embodiment and the recording head of the comparative example in the first supply side common liquid chamber 81A have the following relationship. δPsup (1, 5) is lower than ΔPsup (1, 5) and δPsup (3,5) is lower than ΔPsup (3,5).

The same applies to the pressure difference of the first recovery side common liquid chamber 82A. In the recording head of the comparative example, the first outlet 52A is disposed at the center of the region A2 in the X direction of the first recovery side common liquid chamber 82A. In the first recovery side common liquid chamber 82A, the pressure of the ink increases as separating from the third position where the pressure is the highest in the X2 direction.

On the other hand, n the recording head 10 of the present embodiment, although the pressure of the ink increases as separating from the third position in the X2 direction in the first recovery side common liquid chamber 82A, the degree of increase is lower than that of the recording head of the comparative example.

In addition, in the recording head 10 of the present embodiment, although the pressure of the ink increases as separating from the third position in the X1 direction in the first recovery side common liquid chamber 82A, and the degree of increase is higher than that of the recording head of the comparative example, the pressure difference described above is reduced.

In summary, the pressure differences between the recording head 10 of the present embodiment and the recording head of the comparative example in the first recovery side common liquid chamber 82A have the following relationship. δPcol (1, 5) is lower than ΔPcol (1, 5) and δPcol (3,5) is lower than ΔPcol (3,5).

Such a recording head 10 of the present embodiment has the same effect as that of Embodiment 1. That is, in the recording head 10 of the present embodiment, the pressure difference in each of the first supply side common liquid chamber 81A and the first recovery side common liquid chamber 82A can be reduced, as compared with the recording head in which the flow path resistance Rbp1 and the flow path resistance Rbp2 are the same as each other. Since the pressure difference between the first supply side common liquid chamber 81A and the first recovery side common liquid chamber 82A can be reduced, it is possible to alleviate the size of variation in the flow rate flowing for each of the first nozzles 21A, and to suppress the variation in the viscosity of the liquid for each of the first nozzles.

In addition, similarly to Embodiment 1, in order to suppress the printing unevenness, it is not necessary to invert either the head chip 100A or the head chip 100B by 180 degrees around the Z direction in the recording head 10 of the present embodiment.

When the flow path resistance from the second inlet 51B to the end of the second supply side common liquid chamber 81B in the X1 direction is higher than the flow path resistance from the second inlet 51B to the end of the second supply side common liquid chamber 81B in the X2 direction, and the flow path resistance from the second outlet 52B to the end of the second recovery side common liquid chamber 82B in the X1 direction is higher than the flow path resistance from the second outlet 52B to the end of the second recovery side common liquid chamber 82B in the X2 direction, it is preferable that the flow path resistance Rbp3 of the third bypass flow path 93 is higher than the flow path resistance Rbp4 of the fourth bypass flow path 94. In other words, when the average flow path resistance per unit length from the second inlet 51B to the end of the second supply side common liquid chamber 81B in the X1 direction is higher than the average flow path resistance per unit length from the second inlet 51B to the end of the second supply side common liquid chamber 81B in the X2 direction, and the average flow path resistance per unit length from the second outlet 52B to the end of the second recovery side common liquid chamber 82B in the X1 direction is higher than the average flow path resistance per unit length from the second outlet 52B to the end of the second recovery side common liquid chamber 82B in the X2 direction, it is preferable that the flow path resistance Rbp3 of the third bypass flow path 93 is higher than the flow path resistance Rbp4 of the fourth bypass flow path 94. Even in such a case, when the head chip 100A and the head chip 100B are disposed such that the end portion TA and the end portion TB overlap each other in the Y direction as described above, it is possible to eliminate the need to invert either the head chip 100A or the head chip 100B in order to suppress the printing unevenness at the end portion TA and the end portion TB that are joints of the adjacent first nozzle row 22A and second nozzle row 22B.

Embodiment 3

Figure 15:
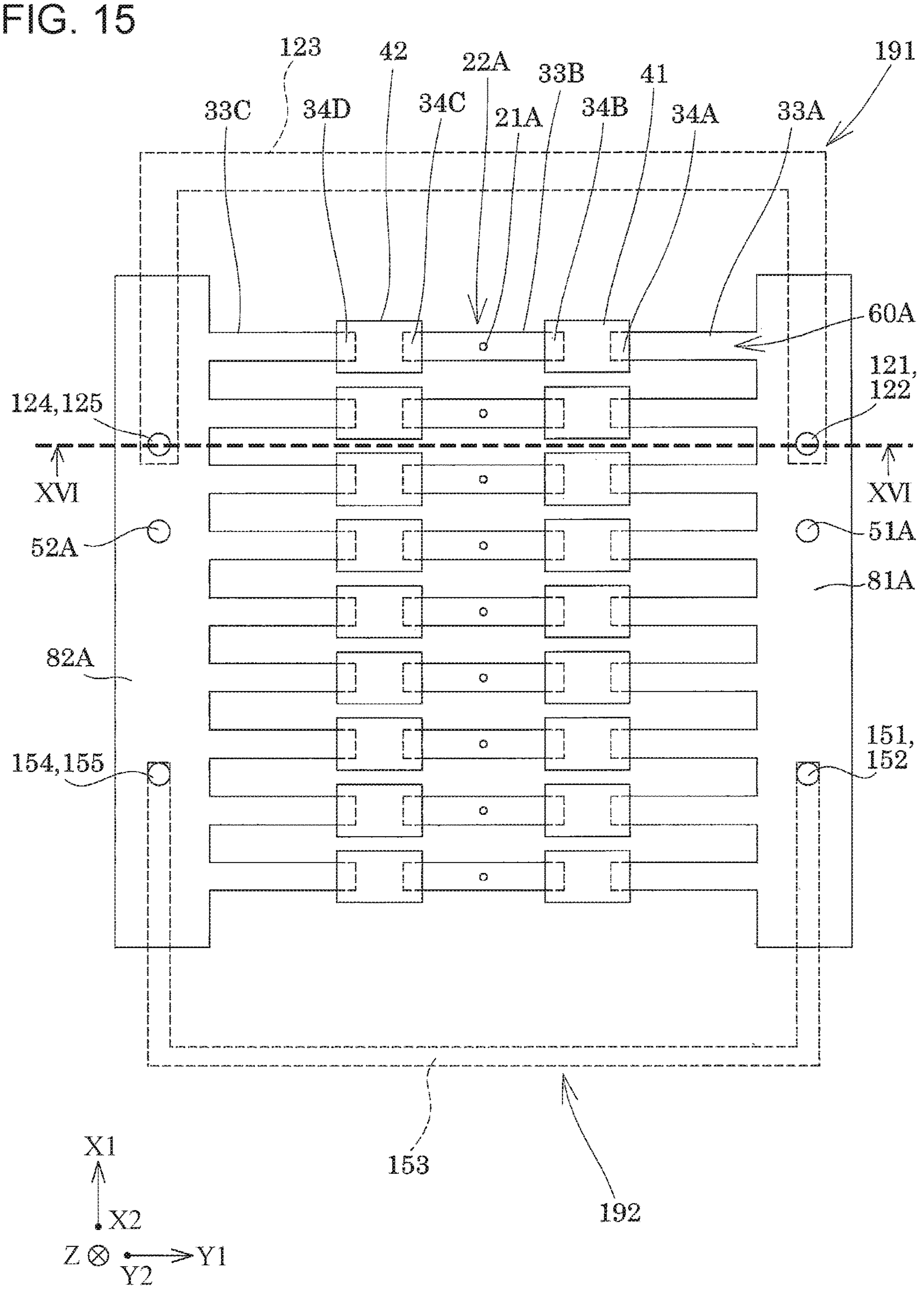
FIG. 15 is a plan view of a flow path of ink formed in a head chip according to Embodiment 3.
Figure 16:
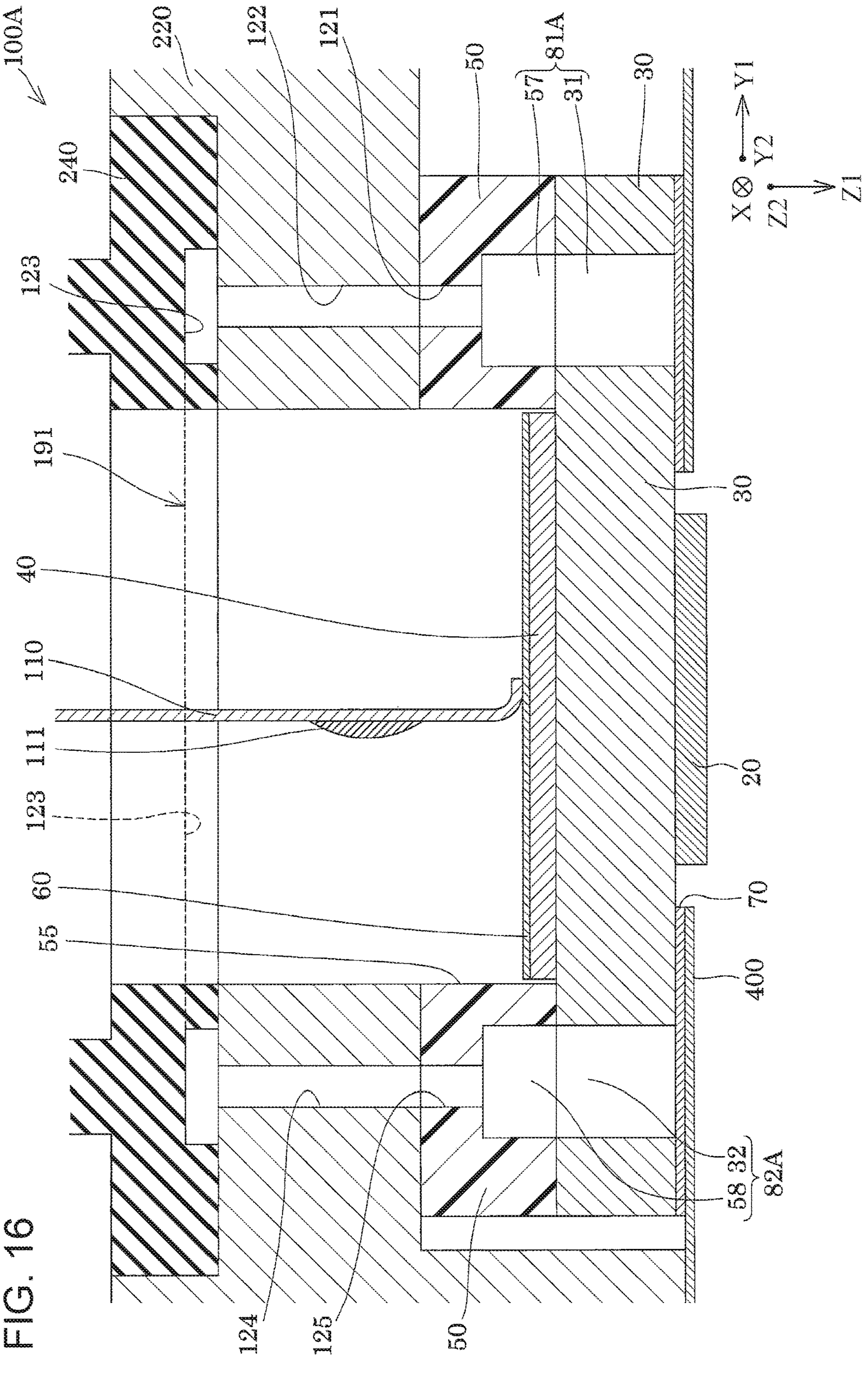
FIG. 16 is a cross-sectional view taken along line XVI-XVI in FIG. 15.

FIG. 15 is a plan view of a flow path of the ink formed in the head chip 100, and FIG. 16 is a cross-sectional view taken along line XVI-XVI in FIG. 15. The same members as those in Embodiment 1 are designated by the same reference numerals, and redundant descriptions will be omitted. In addition, although the following description is the description of the head chip 100A, since the same applies to the head chip 100B, redundant descriptions will be omitted.

In Embodiment 1, the first bypass flow path 91 and the second bypass flow path 92 are formed by the communication plate 30 and the compliance substrate 70 forming the first supply side common liquid chamber 81A and the first recovery side common liquid chamber 82A, but the configuration is not limited to such a configuration.

The recording head 10 of the present embodiment includes a first bypass flow path 191 and a second bypass flow path 192.

The liquid chamber forming substrate 50 is formed with a first bypass flow path portion 121 that penetrates in the Z direction and communicates with the first supply side common liquid chamber 81A. In addition, the liquid chamber forming substrate 50 is formed with a first bypass flow path portion 125 that penetrates in the Z direction and communicates with the first recovery side common liquid chamber 82A.

The second flow path member 220 is formed with a first bypass flow path portion 122 that penetrates in the Z direction and communicates with the first bypass flow path portion 121. In addition, the second flow path member 220 is formed with a first bypass flow path portion 124 that penetrates in the Z direction and communicates with the first bypass flow path portion 125.

A first bypass flow path portion 123 is formed on a joint surface between the second flow path member 220 and the third flow path member 230. The first bypass flow path portion 123 is coupled to the first bypass flow path portion 122 and the first bypass flow path portion 124 so as to bypass a second wiring insertion hole 226 and a third wiring insertion hole 234 in the X1 direction.

The first bypass flow path 191 is formed in which such a first bypass flow path portion 121, the first bypass flow path portion 122, the first bypass flow path portion 123, the first bypass flow path portion 124, and the first bypass flow path portion 125 communicate in this order. The liquid chamber forming substrate 50 is formed with a second bypass flow path portion 151 that penetrates in the Z direction and communicates with the first supply side common liquid chamber 81A. In addition, the liquid chamber forming substrate 50 is formed with a second bypass flow path portion 155 that penetrates in the Z direction and communicates with the first recovery side common liquid chamber 82A.

The second flow path member 220 is formed with a second bypass flow path portion 152 that penetrates in the Z direction and communicates with the second bypass flow path portion 151. In addition, the second flow path member 220 is formed with a second bypass flow path portion 154 that penetrates in the Z direction and communicates with the second bypass flow path portion 155.

A second bypass flow path portion 153 is formed on the joint surface between the second flow path member 220 and the third flow path member 230. The second bypass flow path portion 153 is coupled to the second bypass flow path portion 152 and the second bypass flow path portion 154 so as to bypass a second wiring insertion hole 226 and a third wiring insertion hole 234 in the X2 direction.

The second bypass flow path 192 is formed in which such a second bypass flow path portion 151, the second bypass flow path portion 152, the second bypass flow path portion 153, the second bypass flow path portion 154, and the second bypass flow path portion 155 communicate in this order.

As described above, in the recording head 10 of the present embodiment, the first bypass flow path 191 and the second bypass flow path 192 are formed in the second flow path member 220 and the third flow path member 230 different from the communication plate 30 and the nozzle substrate 20 constituting the first supply side common liquid chamber 81A and the first recovery side common liquid chamber 82A. That is, the head chip 100A may be configured to include a part of the first bypass flow path 191 and a part of the second bypass flow path 192. The same applies to the head chip 100B.

In addition, in the recording head 10 of the present embodiment, the openings at both ends of the first bypass flow path 191 are located inside the first nozzles 21A at both ends of the first nozzle row 22A disposed side by side in the X direction when viewed in the Z1 direction. Similarly, the openings at both ends of the second bypass flow path 192 are located inside the first nozzles 21A at both ends of the first nozzle row 22A disposed side by side in the X direction when viewed in the Z1 direction. As a matter of course, the configuration is not limited to such a configuration, and similarly to Embodiment 1, the openings at both ends of the first bypass flow path 191 and the openings at both ends of the second bypass flow path 192 may be located outside the first nozzles 21A at both ends of the first nozzle rows 22A disposed side by side in the X direction when viewed in the Z1 direction.

The flow path resistance Rbp1 of the first bypass flow path 191 is lower than the flow path resistance Rbp2 of the second bypass flow path 192.

Such a recording head 10 of the present embodiment has the same effect as that of Embodiment 1. In addition, similarly to Embodiment 1, in order to suppress the printing unevenness, it is not necessary to invert either the head chip 100A or the head chip 100B by 180 degrees around the Z direction in the recording head 10 of the present embodiment.

The first bypass flow path 191 and the second bypass flow path 192 as in the present embodiment can also be applied to the recording head 10 of Embodiment 1, Embodiment 2, and Embodiment 4.

Embodiment 4

Figure 17:
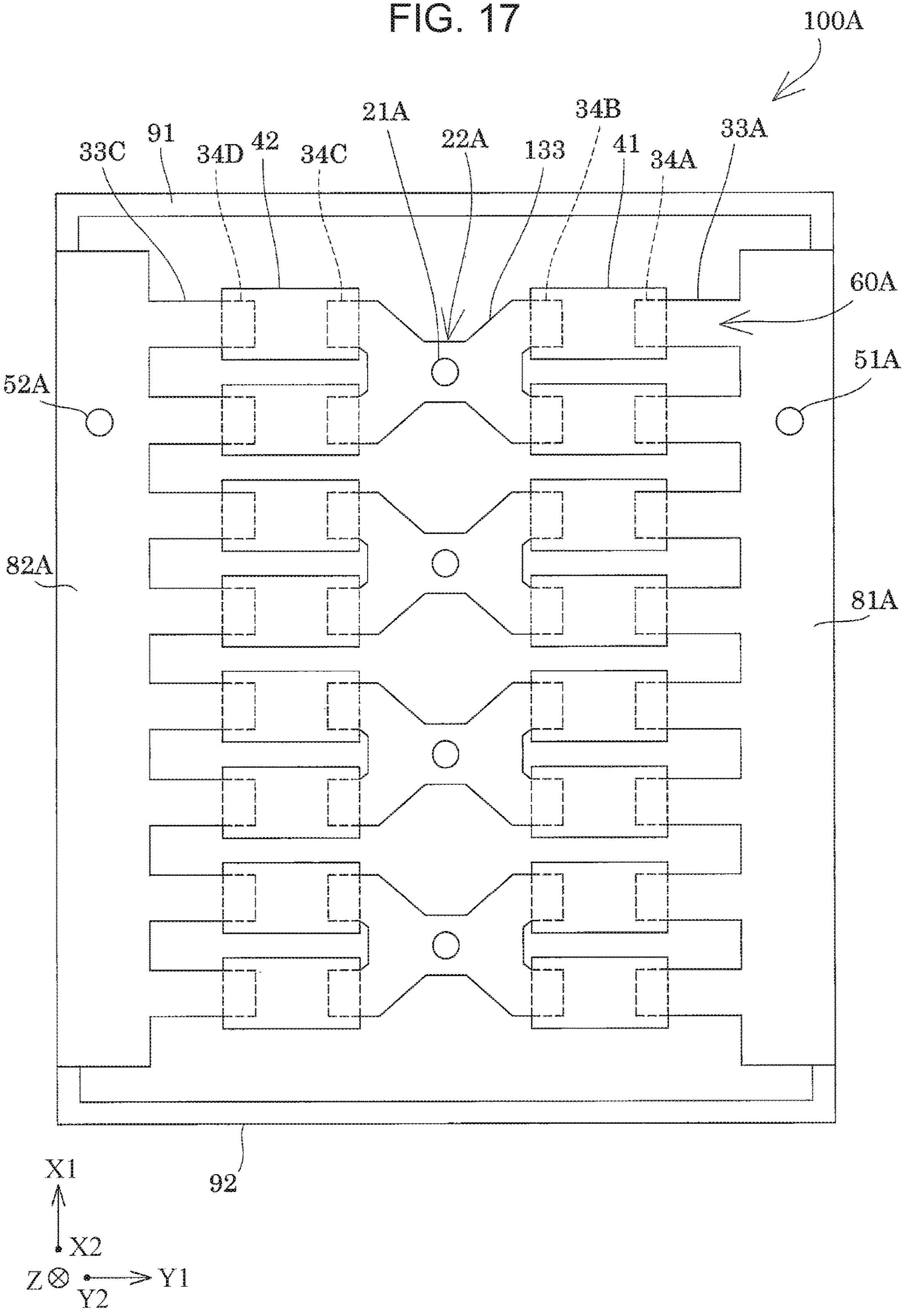
FIG. 17 is a plan view of a flow path of ink formed in a head chip according to Embodiment 4.

FIG. 17 is a plan view of a flow path of ink formed in the head chip 100. The same members as those in Embodiment 1 are designated by the same reference numerals, and redundant descriptions will be omitted. In addition, although the following description is the description of the head chip 100A, since the same applies to the head chip 100B, redundant descriptions will be omitted.

The head chip 100A is provided with M nozzle flow paths 133 corresponding to one-to-one with M first nozzles 21A, 2×M second communication flow path 34B corresponding to one-to-two with M first nozzles 21A, 2×M second communication flow paths 34C corresponding to one-to-two with M first nozzles 21A, 2×M second communication flow paths 34A corresponding to one-to-two with M first nozzles 21A, 2×M second communication flow paths 34D corresponding to one-to-two with M first nozzles 21A, 2×M first communication flow paths 33A corresponding to one-to-two with M first nozzles 21A, and 2×M first communication flow paths 33C corresponding to one-to-two with M first nozzles 21A.

The nozzle flow path 133 communicates with the second communication flow path 34B communicating with each of two first pressure chambers 41 adjacent to each other in the X direction, and communicates with two first pressure chambers 41 adjacent to each other in the X direction via these two second communication flow paths 34B.

The nozzle flow path 133 communicates with the second communication flow path 34C communicating with each of two second pressure chambers 42 adjacent to each other in the X direction, and communicates with two second pressure chambers 42 adjacent to each other in the X direction via these two second communication flow paths 34C.

The nozzle flow path 133 communicates with the first nozzle 21A corresponding to each nozzle flow path 133.

In the head chip 100A, the first supply side common liquid chamber 81A and the first recovery side common liquid chamber 82A communicate with each other through M first individual flow paths 60A corresponding to one-to-one with M first nozzles 21A.

Each of the first individual flow paths 60A includes two first communication flow paths 33A communicating with the first supply side common liquid chamber 81A and adjacent to each other in the X direction, two first pressure chambers 41 adjacent to each other in the X direction communicating with each of two first communication flow paths 33A, the second communication flow paths 34B adjacent to each other in the X direction communicating with each of two first pressure chambers 41 adjacent to each other in the X direction, the nozzle flow path 133 communicating with two second communication flow paths 34B adjacent to each other in the X direction, two second communication flow paths 34C communicating with the nozzle flow path 133 and adjacent to each other in the X direction, two second pressure chambers 42 adjacent to each other in the X direction communicating with each of two second communication flow paths 34C adjacent to each other in the X direction, two second communication flow paths 34D adjacent to each other in the X direction communicating with each of two second pressure chambers 42 adjacent to each other in the X direction, and two first communication flow paths 33C adjacent to each other in the X direction communicating with each of two second communication flow paths 34D adjacent to each other in the X direction.

As described above, in the recording head 10 of the present embodiment, one first individual flow path 60A communicates with one first nozzle 21A, and a plurality of first pressure chambers 41 and second pressure chambers 42 that communicate with the first nozzle 21A are provided.

Such a recording head 10 of the present embodiment has the same effect as that of Embodiment 1. In addition, similarly to Embodiment 1, in order to suppress the printing unevenness, it is not necessary to invert either the head chip 100A or the head chip 100B by 180 degrees around the Z direction in the recording head 10 of the present embodiment.

The first individual flow path 60A as in the present embodiment can also be applied to the recording heads 10 of Embodiment 1 to Embodiment 3.

Other Embodiments

In the above-described embodiment, an ink jet recording head is described as an example of a liquid ejecting head. However, the present disclosure is intended for a wide range of liquid ejecting heads, and can also be applied to a liquid ejecting head that discharges a liquid other than ink.

In the above-described embodiment, the piezoelectric actuator is described as a driving element that causes the pressure change in the pressure chamber, but the configuration is not particularly limited thereto.

What is claimed is:

1. A liquid ejecting head comprising:

a first nozzle row configured by arranging first nozzles, in a first direction, configured to eject a liquid;

first individual flow paths that communicate with each of the first nozzles;

a first supply side common liquid chamber coupled to the first individual flow paths and for supplying the liquid to the first nozzles via the first individual flow paths;

a first recovery side common liquid chamber coupled to the first individual flow paths and for recovering the liquid not discharged from the first nozzles via the first individual flow paths;

a first inlet for supplying the liquid to the first supply side common liquid chamber;

a first outlet for discharging the liquid from the first recovery side common liquid chamber;

a first bypass flow path that couples an end portion of the first supply side common liquid chamber in the first direction and an end portion of the first recovery side common liquid chamber in the first direction; and a second bypass flow path that couples an end portion of the first supply side common liquid chamber in a second direction opposite to the first direction and an end portion of the first recovery side common liquid chamber in the second direction, wherein the first inlet is disposed between the first bypass flow path and the second bypass flow path in the first direction, the first outlet is disposed between the first bypass flow path and the second bypass flow path in the first direction, and a flow path resistance of the first bypass flow path and a flow path resistance of the second bypass flow path are different from each other.

2. The liquid ejecting head according to claim 1, wherein a flow path resistance from the first inlet to an end of the first supply side common liquid chamber in the first direction is lower than a flow path resistance from the first inlet to an end of the first supply side common liquid chamber in the second direction, a flow path resistance from the first outlet to an end of the first recovery side common liquid chamber in the first direction is lower than a flow path resistance from the first outlet to an end of the first recovery side common liquid chamber in the second direction, and the flow path resistance of the first bypass flow path is lower than the flow path resistance of the second bypass flow path.

3. The liquid ejecting head according to claim 2, further comprising:

a second nozzle row configured by arranging second nozzles, in the first direction, configured to eject a liquid;

second individual flow paths that communicate with each of the second nozzles;

a second supply side common liquid chamber coupled to the second individual flow paths and for supplying the liquid to the second nozzles via the second individual flow paths;

a second recovery side common liquid chamber coupled to the second individual flow paths and for recovering the liquid not discharged from the second nozzles via the second individual flow paths;

a second inlet for supplying the liquid to the second supply side common liquid chamber;

a second outlet for discharging the liquid from the second recovery side common liquid chamber;

a third bypass flow path that couples an end portion of the second supply side common liquid chamber in the first direction and an end portion of the second recovery side common liquid chamber in the first direction; and a fourth bypass flow path that couples an end portion of the second supply side common liquid chamber in the second direction and an end portion of the second recovery side common liquid chamber in the second direction, wherein the second inlet is disposed between the third bypass flow path and the fourth bypass flow path in the first direction, the second outlet is disposed between the third bypass flow path and the fourth bypass flow path in the first direction, when viewed in a transport direction of a medium facing the liquid ejecting head, an end portion of the first nozzle row in the second direction and an end portion of the second nozzle row in the first direction overlap each other, or an end portion of the first nozzle row in the first direction and an end portion of the second nozzle row in the second direction overlap each other, when a flow path resistance from the second inlet to an end of the second supply side common liquid chamber in the first direction is lower than a flow path resistance from the second inlet to an end of the second supply side common liquid chamber in the second direction, and a flow path resistance from the second outlet to an end of the second recovery side common liquid chamber in the first direction is lower than a flow path resistance from the second outlet to an end of the second recovery side common liquid chamber in the second direction, a flow path resistance of the third bypass flow path is lower than a flow path resistance of the fourth bypass flow path, and when a flow path resistance from the second inlet to the end of the second supply side common liquid chamber in the first direction is higher than a flow path resistance from the second inlet to the end of the second supply side common liquid chamber in the second direction, and a flow path resistance from the second outlet to the end of the second recovery side common liquid chamber in the first direction is higher than a flow path resistance from the second outlet to the end of the second recovery side common liquid chamber in the second direction, the flow path resistance of the third bypass flow path is higher than the flow path resistance of the fourth bypass flow path.

4. The liquid ejecting head according to claim 1, wherein the first inlet is disposed in the first direction with respect to a center of the first supply side common liquid chamber regarding the first direction, the first outlet is disposed in the first direction with respect to a center of the first recovery side common liquid chamber regarding the first direction, and the flow path resistance of the first bypass flow path is lower than the flow path resistance of the second bypass flow path.

5. The liquid ejecting head according to claim 4, wherein the first inlet is disposed in a region located on a first direction side among regions obtained by dividing the first supply side common liquid chamber into three parts in the first direction, and the first outlet is disposed in a region located on the first direction side among regions obtained by dividing the first recovery side common liquid chamber into three parts in the first direction.

6. The liquid ejecting head according to claim 4, wherein the first inlet is disposed in a region located on a first direction side among regions obtained by dividing the first supply side common liquid chamber into five parts in the first direction, and the first outlet is disposed in a region located on the first direction side among regions obtained by dividing the first recovery side common liquid chamber into five parts in the first direction.

7. The liquid ejecting head according to claim 4, wherein when a distance in the first direction from the first inlet to an end of the first supply side common liquid chamber in the first direction is defined as $\alpha$, a distance in the first direction from the first inlet to an end of the first supply side common liquid chamber in the second direction is defined as $\beta$, the flow path resistance of the first bypass flow path is defined as Rbp1, and the flow path resistance of the second bypass flow path is defined as Rbp2, $Rbp1 \approx Rbp2 \times \alpha/\beta$.

8. The liquid ejecting head according to claim 1, wherein an average flow path resistance per unit length from the first inlet to an end of the first supply side common liquid chamber in the first direction is lower than an average flow path resistance per unit length from the first inlet to an end of the first supply side common liquid chamber in the second direction, an average flow path resistance per unit length from the first outlet to an end of the first recovery side common liquid chamber in the first direction is lower than an average flow path resistance per unit length from the first outlet to an end of the first recovery side common liquid chamber in the second direction, and the flow path resistance of the first bypass flow path is lower than the flow path resistance of the second bypass flow path.

9. The liquid ejecting head according to claim 8, wherein the first inlet is disposed at a center of the first supply side common liquid chamber in the first direction, and the first outlet is disposed at a center of the first recovery side common liquid chamber in the first direction.

10. The liquid ejecting head according to claim 8, wherein when an average flow path resistance per unit length from the first inlet to the end of the first supply side common liquid chamber in the first direction is defined as $\gamma$, an average flow path resistance per unit length from the first inlet to the end of the first supply side common liquid chamber in the second direction is defined as $\delta$, the flow path resistance of the first bypass flow path is defined as Rbp1, and the flow path resistance of the second bypass flow path is defined as Rbp2, $Rbp1 \approx Rbp2 \times \gamma/\delta$.

11. The liquid ejecting head according to claim 1, further comprising:

a supply side flexible member that defines a part of the first supply side common liquid chamber and has flexibility; and a recovery side flexible member that defines a part of the first recovery side common liquid chamber and has flexibility.

12. The liquid ejecting head according to claim 1, wherein a distance between the first inlet and an end of the first supply side common liquid chamber in the first direction and a distance between the first outlet and an end of the first recovery side common liquid chamber in the first direction are substantially the same as each other.

13. A liquid ejecting apparatus comprising:

the liquid ejecting head according to claim 1; and a circulation mechanism including a liquid storage portion that stores a liquid and for circulating the liquid between the liquid ejecting head and the liquid storage portion.

* * * * *